United States Patent
Glass et al.

(10) Patent No.: US 10,599,659 B2
(45) Date of Patent: Mar. 24, 2020

(54) METHOD AND SYSTEM FOR EVALUATING USER SATISFACTION WITH RESPECT TO A USER SESSION

(71) Applicant: Yahoo Holdings, Inc., Sunnyvale, CA (US)

(72) Inventors: Alyssa Glass, Sunnyvale, CA (US); Scott Gaffney, Palo Alto, CA (US); Xing Yi, Milpitas, CA (US)

(73) Assignee: Oath Inc., New York, NY (US)

( * ) Notice: Subject to any disclaimer, the term of this patent is extended or adjusted under 35 U.S.C. 154(b) by 81 days.

(21) Appl. No.: 14/270,862

(22) Filed: May 6, 2014

(65) Prior Publication Data

US 2015/0324361 A1    Nov. 12, 2015

(51) Int. Cl.
*G06F 16/2457* (2019.01)
*G06Q 30/02* (2012.01)

(52) U.S. Cl.
CPC ... *G06F 16/24578* (2019.01); *G06Q 30/0256* (2013.01)

(58) Field of Classification Search
CPC ..... H04L 41/5067; G06Q 30/02; G06F 17/30; G06F 17/30867; G06F 16/24578
See application file for complete search history.

(56) References Cited

U.S. PATENT DOCUMENTS

| | | | | |
|---|---|---|---|---|
| 7,526,470 | B1 * | 4/2009 | Karnawat | G06F 17/30867 |
| 7,587,324 | B2 * | 9/2009 | Kaiser | G06Q 10/0639 |
| | | | | 379/265.02 |
| 7,805,278 | B1 * | 9/2010 | Rotondo | G06Q 10/06 |
| | | | | 235/386 |
| 7,984,000 | B2 * | 7/2011 | Heath | G06F 17/30864 |
| | | | | 706/20 |
| 8,307,005 | B1 * | 11/2012 | He | G06F 17/30 |
| | | | | 707/791 |

(Continued)

FOREIGN PATENT DOCUMENTS

| | | |
|---|---|---|
| CN | 102156746 A | 8/2011 |
| CN | 103186604 A | 7/2013 |

OTHER PUBLICATIONS

J. Ranstam, Why the P-value culture is bad and confidence intervals a better alternative, In Osteoarthritis and Cartilage, vol. 20, Issue 8, Aug. 2012, pp. 805-808, ISSN 1063-4584, https://doi.org/10.1016/j.joca.2012.04.001. (http://www.sciencedirect.com/science/article/pii/S1063458412007789) (Year: 2012).*

(Continued)

*Primary Examiner* — Robert W Beausoliel, Jr.
*Assistant Examiner* — Arthur Ganger
(74) *Attorney, Agent, or Firm* — Pillsbury Winthrop Shaw Pittman LLP

(57) ABSTRACT

Methods, systems and programming for evaluating user satisfaction with respect to a user session are presented. In one example, one or more queries in a use session are received from a user. Information about one or more user activities is obtained. Each user activity is related to manipulation of a content item associated with one of the one or more queries. A score associated with the user session is computed based at least partially on the one or more user activities. User satisfaction with respect to the user session is determined based on the score.

20 Claims, 21 Drawing Sheets

(56) References Cited

U.S. PATENT DOCUMENTS

| | | | |
|---|---|---|---|
| 8,621,359 B2* | 12/2013 | Cao | G06F 3/0482 |
| | | | 715/734 |
| 8,688,667 B1* | 4/2014 | Kurzion | G06F 17/30867 |
| | | | 706/16 |
| 9,342,626 B1* | 5/2016 | Das | G06F 17/3097 |
| 10,083,205 B2* | 9/2018 | Shapira | G06F 16/2425 |
| 2005/0125390 A1* | 6/2005 | Hurst-Hiller | G06F 17/30867 |
| 2006/0122978 A1* | 6/2006 | Brill | G06F 17/30867 |
| 2008/0281809 A1 | 11/2008 | Anderson et al. | |
| 2008/0306830 A1* | 12/2008 | Lasa | G06Q 30/02 |
| | | | 705/14.16 |
| 2010/0031190 A1* | 2/2010 | Hall | G06F 17/30991 |
| | | | 715/806 |
| 2010/0082637 A1* | 4/2010 | Mishne | G06F 17/30867 |
| | | | 707/748 |
| 2011/0040733 A1* | 2/2011 | Sercinoglu | G06Q 30/02 |
| | | | 707/688 |
| 2011/0078147 A1* | 3/2011 | Klinkner | G06Q 30/02 |
| | | | 707/740 |
| 2011/0270824 A1* | 11/2011 | Morris | G06F 16/9038 |
| | | | 707/722 |
| 2011/0296351 A1* | 12/2011 | Ewing, Jr. | G06F 3/0346 |
| | | | 715/841 |
| 2013/0173573 A1* | 7/2013 | Song | G06F 17/30864 |
| | | | 707/706 |
| 2013/0262444 A1* | 10/2013 | Leslie | G06F 16/9038 |
| | | | 707/722 |
| 2013/0332455 A1* | 12/2013 | Ghemawat | G06F 17/30867 |
| | | | 707/732 |
| 2016/0224197 A1* | 8/2016 | Lee | G06F 3/04845 |
| 2016/0246890 A1* | 8/2016 | Garg | H04L 67/10 |

OTHER PUBLICATIONS

Ahmed Hassan et al., Personalized Models of Search Satisfaction, CIKM'13, Oct. 27-Nov. 1, 2013, San Francisco, CA, 10 pages.

Diane Kelly et al., Display Time as Implicit Feedback: Understanding Task Effects, SIGIR'04, Jul. 25-29, 2004, Sheffield, South Yorkshire, UK, 8 pages.

Ryen W. White et al., A Study on the Effects of Personalization and Task Information on Implicit Feedback Performance, CIKM'06, Nov. 5-11, 2006, Arlington, Virginia, 10 pages.

Songhua Xu et al, A User-Oriented Webpage Ranking Algorithm Based on User Attention Time, Proceedings of the Twenty-Third AAAI Conference on Artificial Intelligence (2008), pp. 1255-1260.

Chao Liu et al., Understanding Web Browsing Behaviors through Weibull Analysis of Dwell Time, SIGIR'10, Jul. 19-23, 2010, Geneva, Switzerland, 8 pages.

Songhua Xu et al, Mining User Dwell Time for Personalized Web Search Re-Ranking, Proceedings of the Twenty-Second International Joint Conference on Artificial Intelligence (2011), pp. 2367-2372.

Chao Liu et al., Using Dwell Time as an Implicit Measure of Usefulness in Different Task Types, SASIST 2011, Oct. 9-13, 2011, New Orleans, LA, 4 pages.

Office Action dated Mar. 12, 2018 in Chinese Application No. 201510093794.5.

Office Action dated Jul. 26, 2018 in European Application 15160134.1.

Office Action dated Dec. 5, 2018 in Chinese Application 201510093794.5.

Office Action dated Jul. 12, 2019 in Chinese Application No. 201510093794.5.

Notice of Allowance dated Jun. 20, 2019 in Taiwanese Application No. 104104680.

Office Action dated Jun. 19, 2017 in Taiwanese Application 104104680.

* cited by examiner

METHOD AND SYSTEM FOR EVALUATING USER SATISFACTION WITH RESPECT TO A USER SESSION

BACKGROUND

1. Technical Field

The present teaching relates to methods, systems, and programming for user satisfaction assessment. Particularly, the present teaching is directed to methods, systems, and programming for evaluating user satisfaction with respect to a user session.

2. Discussion of Technical Background

Online content search is a process of interactively searching for and retrieving requested information via a search application running on a local user device, such as a computer or a mobile device, from online databases. Online search is conducted through a search system including search engines, which are programs running at a remote server and searching for content based on specified queries or keywords submitted by a user. A search result of an online search may include either a list of the documents or some content items provided to the user. To improve a user's searching experience with a search system, it is critical to evaluate the user's satisfaction regarding performance of the search system.

However, existing techniques are limited to evaluating user satisfaction with respect to each single query, although it is more desirable to evaluate a user's satisfaction regarding a user session that comprises a group of consecutive queries, especially when the queries in the user session are related to one topic that can reflect an information need of the user. In addition, traditional search system does not evaluate user satisfaction based on user activities related to manipulation of content items. For example, after a user enters a query and receives a content item related to the query on a touchscreen, the user performs some activities related to manipulation of the content item, including but not limited to pressing down the content item, swiping the content item, and zooming in or out the content item. While information related to these activities may be utilized to automatically determine or predict user satisfaction, traditional methods estimate user satisfaction merely based on labeling or bookmarking from the user regarding the content item.

Therefore, there is a need to provide an improved solution for evaluating user satisfaction to avoid the above-mentioned drawbacks.

SUMMARY

The present teaching relates to methods, systems, and programming for user satisfaction assessment. Particularly, the present teaching is directed to methods, systems, and programming for evaluating user satisfaction with respect to a user session.

In one example, a method, implemented on at least one machine each having at least one processor, storage, and a communication platform connected to a network for evaluating user satisfaction with respect to a user session is presented. One or more queries in a use session are received from a user. Information about one or more user activities is obtained. Each user activity is related to manipulation of a content item associated with one of the one or more queries. A score associated with the user session is computed based at least partially on the one or more user activities. User satisfaction with respect to the user session is determined based on the score.

In a different example, a system having at least one processor, storage, and a communication platform for evaluating user satisfaction with respect to a user session is presented. The system includes a query analyzing unit, a user activity detection unit, a user satisfaction determining unit, and a user satisfaction report generation unit. The query analyzing unit is implemented on the at least one processor and configured for receiving, in a user session, one or more queries from a user. The user activity detection unit is implemented on the at least one processor and configured for obtaining information about one or more user activities each of which is related to manipulation of a content item associated with one of the one or more queries. The user satisfaction determining unit is implemented on the at least one processor and configured for computing a score associated with the user session based at least partially on the one or more user activities. The user satisfaction report generation unit is implemented on the at least one processor and configured for determining user satisfaction with respect to the user session based on the score.

Other concepts relate to software for providing query suggestions. A software product, in accord with this concept, includes at least one non-transitory machine-readable medium and information carried by the medium. The information carried by the medium may be executable program code data regarding parameters in association with a request or operational parameters, such as information related to a user, a request, or a social group, etc.

In one example, a non-transitory machine readable medium having information recorded thereon for evaluating user satisfaction with respect to a user session is presented. The recorded information, when read by the machine, causes the machine to perform the following. One or more queries in a use session are received from a user. Information about one or more user activities is obtained. Each user activity is related to manipulation of a content item associated with one of the one or more queries. A score associated with the user session is computed based at least partially on the one or more user activities. User satisfaction with respect to the user session is determined based on the score.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of efficient and effective user satisfaction evaluation. The method and system as disclosed herein aim at improving end-users' satisfaction of search experience by providing an accurate and prompt user satisfaction assessment.

In the context of mobile or other similar environments, a list of search result links may not be as practical. When approaches other than the traditional list of search result links are utilized to enable users to access content items related to a query, it may not be enough to evaluate user satisfaction based solely on click-thru measurements. For example, search results can be presented as "cards" that are loaded with content relevant to a user query, reducing the need for a user to click/tap on a link to access an external or third party site that comprise the same content. As such, it is important not to rely solely on click-thru activities in such scenarios, and to assess user satisfaction based on other user activities, such as scrolling vertically through information, swiping horizontally through a carousel of information, pinches, zooms, rotations, dismissals, collapses, external application selection actions related to the information cards, etc.

In addition, when a user has an information need related to a topic, the user may enter queries consecutively about the topic within a period of time. The queries fall into a user session, during which the above mentioned user activities may be detected and utilized to determine whether the user is satisfied with respect to the entire user session or how satisfied the user is.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 1:
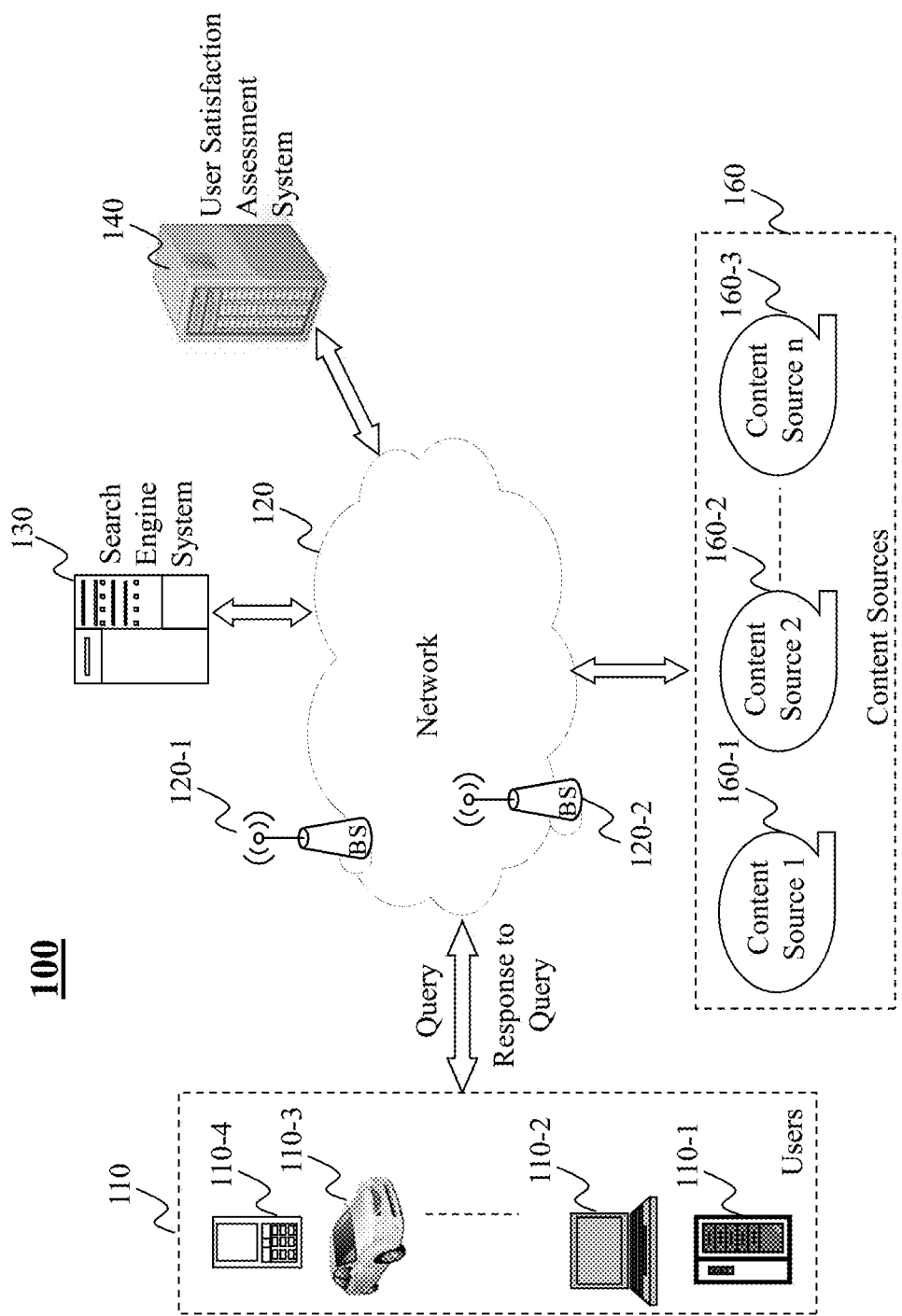
FIG. 1 is a high level depiction of an exemplary networked environment for evaluating user satisfaction with respect to a user session, according to an embodiment of the present teaching.

FIG. 1 is a high level depiction of an exemplary networked environment 100 for evaluating user satisfaction with respect to a user session, according to an embodiment of the present teaching. In FIG. 1, the exemplary networked environment 100 includes a search engine system 130, a user satisfaction assessment system 140, one or more users 110, a network 120, and content sources 160. The network 120 may be a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof. In an example of Internet advertising, the network 120 may be an online advertising network or ad network that is a company connecting advertisers to web sites that want to host advertisements. A key function of an ad network is aggregation of ad space supply from publishers and matching it with advertiser demand. The network 120 may also include various network access points, e.g., wired or wireless access points such as base stations or Internet exchange points 120-1 . . . 120-2, through which a data source may connect to the network 120 in order to transmit information via the network 120.

Users 110 may be of different types such as users connected to the network 120 via desktop computers 110-1, laptop computers 110-2, a built-in device in a motor vehicle 110-3, or a mobile device 110-4. A user 110 may send a query to the search engine system 130 via the network 120 and receive a response to the query from the search engine system 130. The response may include search results and/or content items related to the query.

The user satisfaction assessment system 140 can evaluate whether the user 110 is satisfied with the search service provided by the search engine system 130, based on user activities from the user 110 related to manipulation of a search result or a content item on a user interface. In this embodiment, the user satisfaction assessment system 140 directly connects to the network 120 and can communicate with the users 110 directly via the network 120.

The content sources 160 include multiple content sources 160-1, 160-2 . . . 160-3, such as vertical content sources. A content source 160 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The search engine system 130 may access information from any of the content sources 160-1, 160-2 . . . 160-3.

For example, the search engine system 130 may fetch content, e.g., websites, through its web crawler to build a search index.

Figure 2:
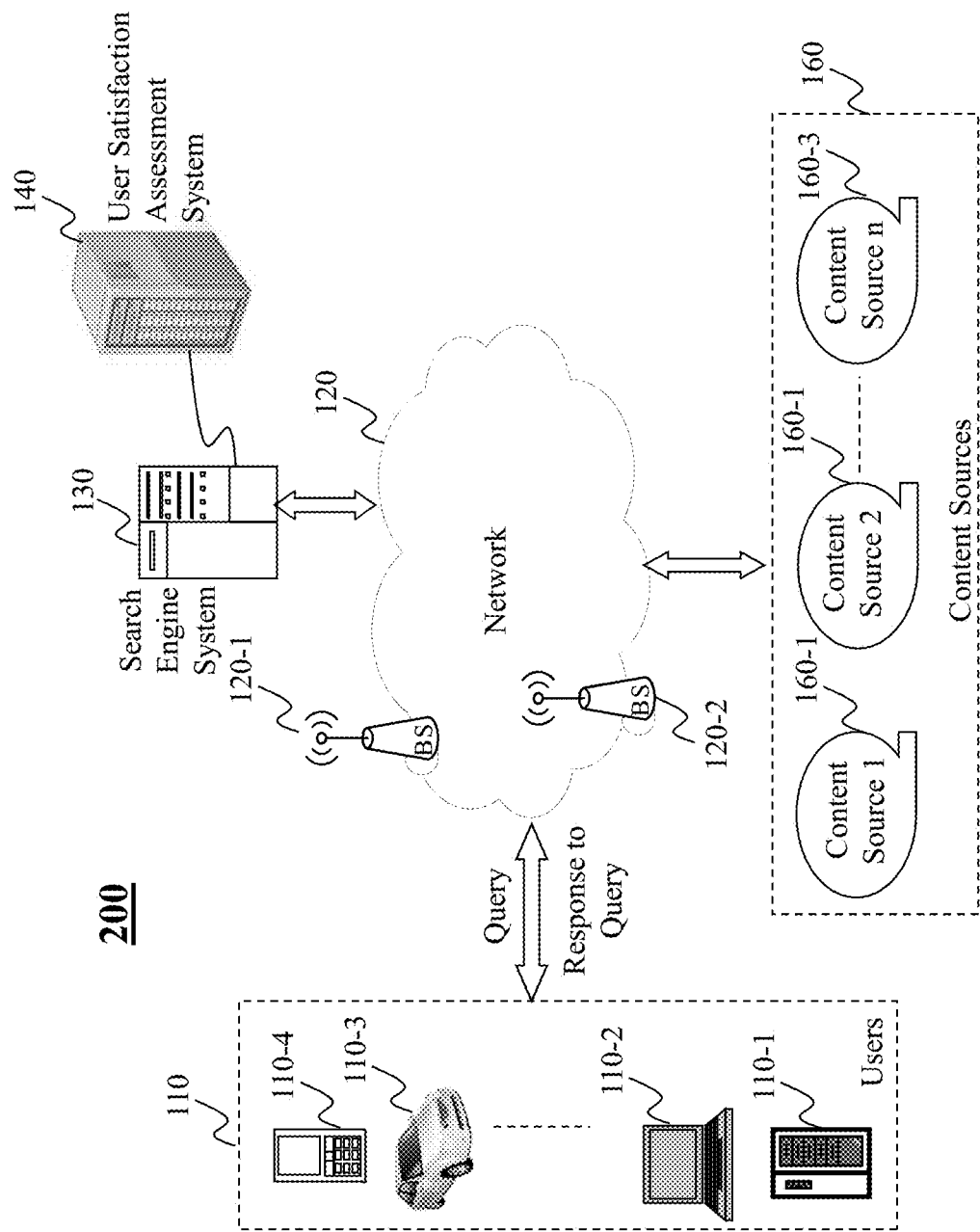
FIG. 2 is a high level depiction of another exemplary networked environment for evaluating user satisfaction with respect to a user session, according to an embodiment of the present teaching.

FIG. 2 is a high level depiction of another exemplary networked environment 200 for evaluating user satisfaction with respect to a user session, according to an embodiment of the present teaching. The exemplary networked environment 200 in this embodiment is similar to the exemplary networked environment 100 in FIG. 1, except that the user satisfaction assessment system 140 in this embodiment connects to the network 120 via the search engine system 130. For example, the user satisfaction assessment system 140 may serve as a backend of the search engine system 130 to evaluate user satisfaction of users communicating with the search engine system 130.

Figure 3:
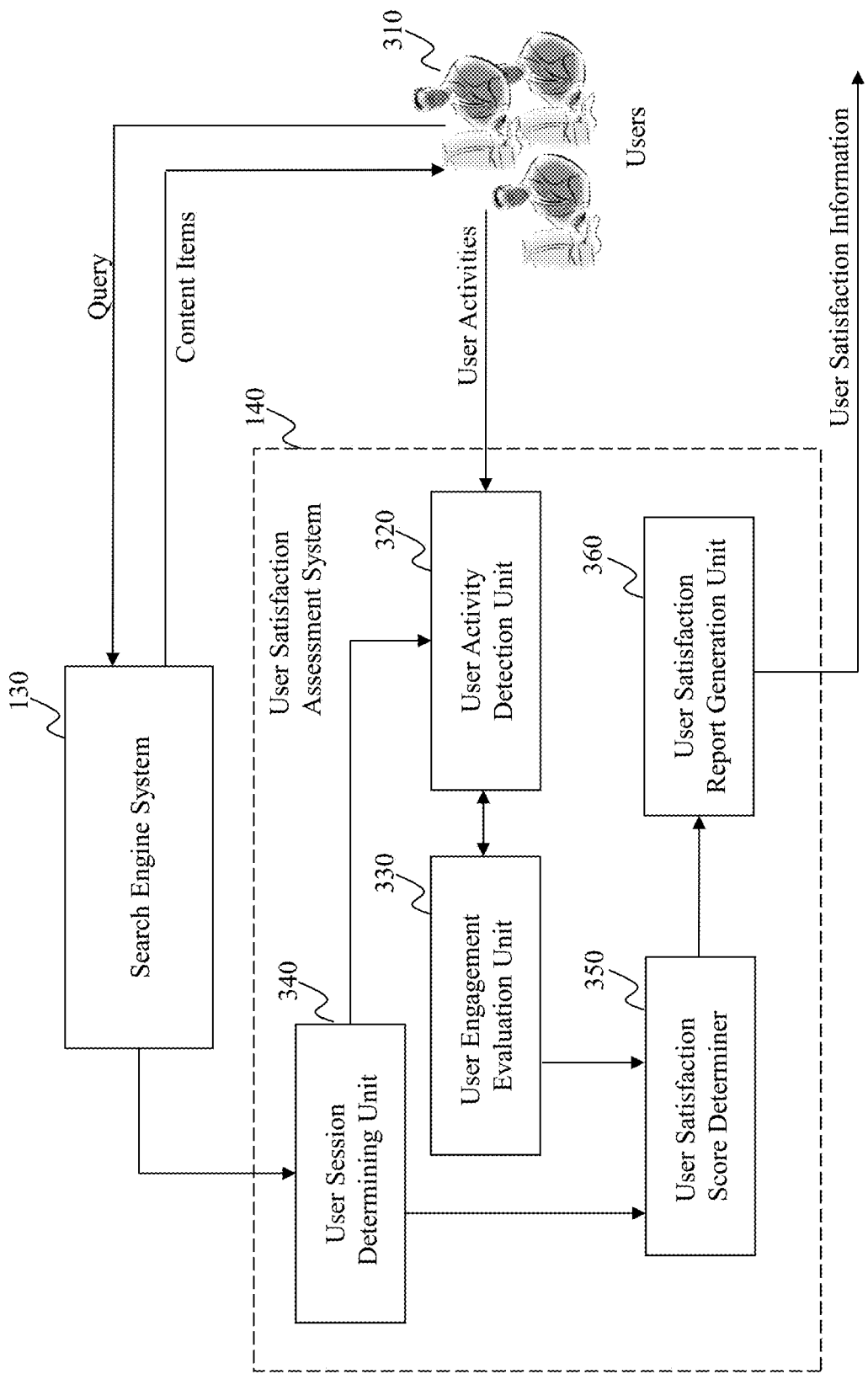
FIG. 3 illustrates an exemplary diagram of a user satisfaction assessment system for evaluating user satisfaction with respect to a user session, according to an embodiment of the present teaching.

FIG. 3 illustrates an exemplary diagram of a user satisfaction assessment system 140 for evaluating user satisfaction with respect to a user session, according to an embodiment of the present teaching. The user satisfaction assessment system 140 may be in an exemplary networked environment, e.g., the networked environment 100 in FIG. 1 or the networked environment 200 in FIG. 2. The user satisfaction assessment system 140 in this example includes a user activity detection unit 320, a user engagement evaluation unit 330, a user session determining unit 340, a user satisfaction score determiner 350, and a user satisfaction report generation unit 360. A search engine system 130 is also shown in FIG. 3 for reference. Based on the query input by the user 310, the search engine system 130 may send content items to the user 310. The content items may be presented to the user 310 via a user interface. In some embodiments, a content item is an information card related to a user query on which content related to the information card is presented.

Figure 15:
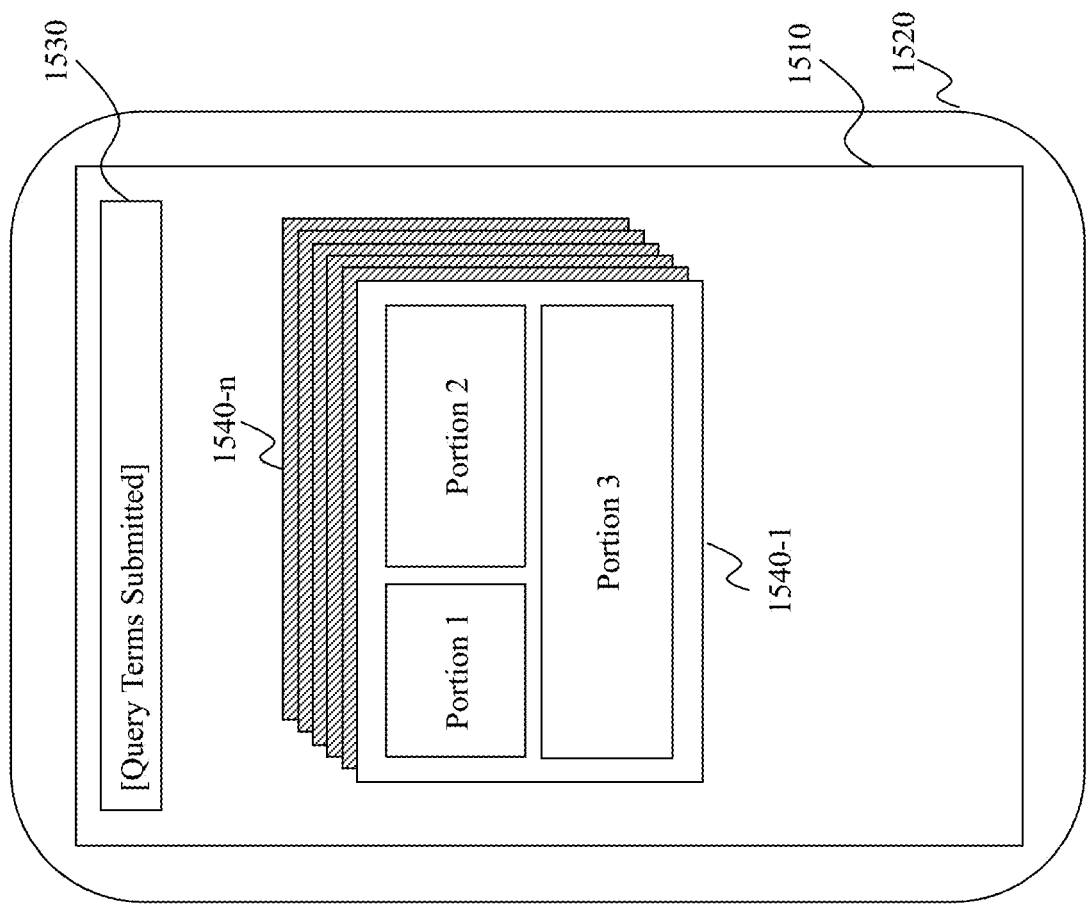
FIG. 15 illustrates content items on a user interface, according to an embodiment of the present teaching.

For example, FIG. 15 illustrates a user interface 1510 on a mobile device 1520 after a user has submitted query terms in query input area 1530. In response to the submission of the query terms, a stack of content items or information cards 1540-1 . . . 1540-*n* is presented to the user on the user interface 1510. As shown, in some embodiments, the presentation of the information cards is provided to a user without providing an intermediate set of results related to the query after the receipt of the query and before the presentation of the information cards. The presentation of the information cards is, for example, provided to the user without first presenting the user with a list of search result links and requiring the user to select (e.g., by clicking, tapping, etc.) one of the presented search result links to be provided with the presentation of the content items. As depicted, the information card 1540-1 is presented on top of the other information cards 1540 such that content of the information card 1540-1 (e.g., within portions of the information card 1540-1) is in view on the user interface 1510. In some embodiments, the user can view or otherwise access the content of the other information cards by swiping away the information card 1540-1, dragging the information card 1540-1 to another position within the stack of information cards 1540, selecting another one of the information cards 1540, etc. In some embodiments, each of the information cards 1540 may corresponding to a respective domain (e.g., weather, restaurants, movies, music, navigation, calendar, etc.). Viewing or otherwise accessing the content of other information cards may thus allow a user to view or otherwise access the content of information pertaining to other domains.

The user session determining unit 340 may determine whether a query from a user belongs to a new user session or a current user session. A user session may be a period of interactive information interchange between a user and a server. In one example, the user may be the user 110 and the server may be the search engine system 130 and/or the user satisfaction assessment system 140. Since the user satisfaction assessment system 140 in this example is configured for evaluating user satisfaction regarding services provided by the search engine system 130 to the user 310, a definition of user session regarding the user 310 may be the same for the search engine system 130 and the user satisfaction assessment system 140. Therefore, the user session determining unit 340 may be located either in the user satisfaction assessment system 140 in this example, or in the search engine system 130 in another example. In either example, the information related to user session can be shared between the search engine system 130 and the user satisfaction assessment system 140.

In one embodiment, the user session determining unit 340 may even be located at a client device of the user 310, so that the user 310 may manually define a user session or set up a configuration for defining a user session at the user side. The user session definition at the user side may be sent to the search engine system 130 and/or 140 for evaluating user satisfaction with respect to a user session.

A user session can be defined based on a particular user, a starting time, an ending time, and a session separation mode. A session separation mode can be utilized to determine a starting time and an ending time of a user session of a particular user. In accordance with various embodiments, different session separation modes can be utilized.

Figure 11:
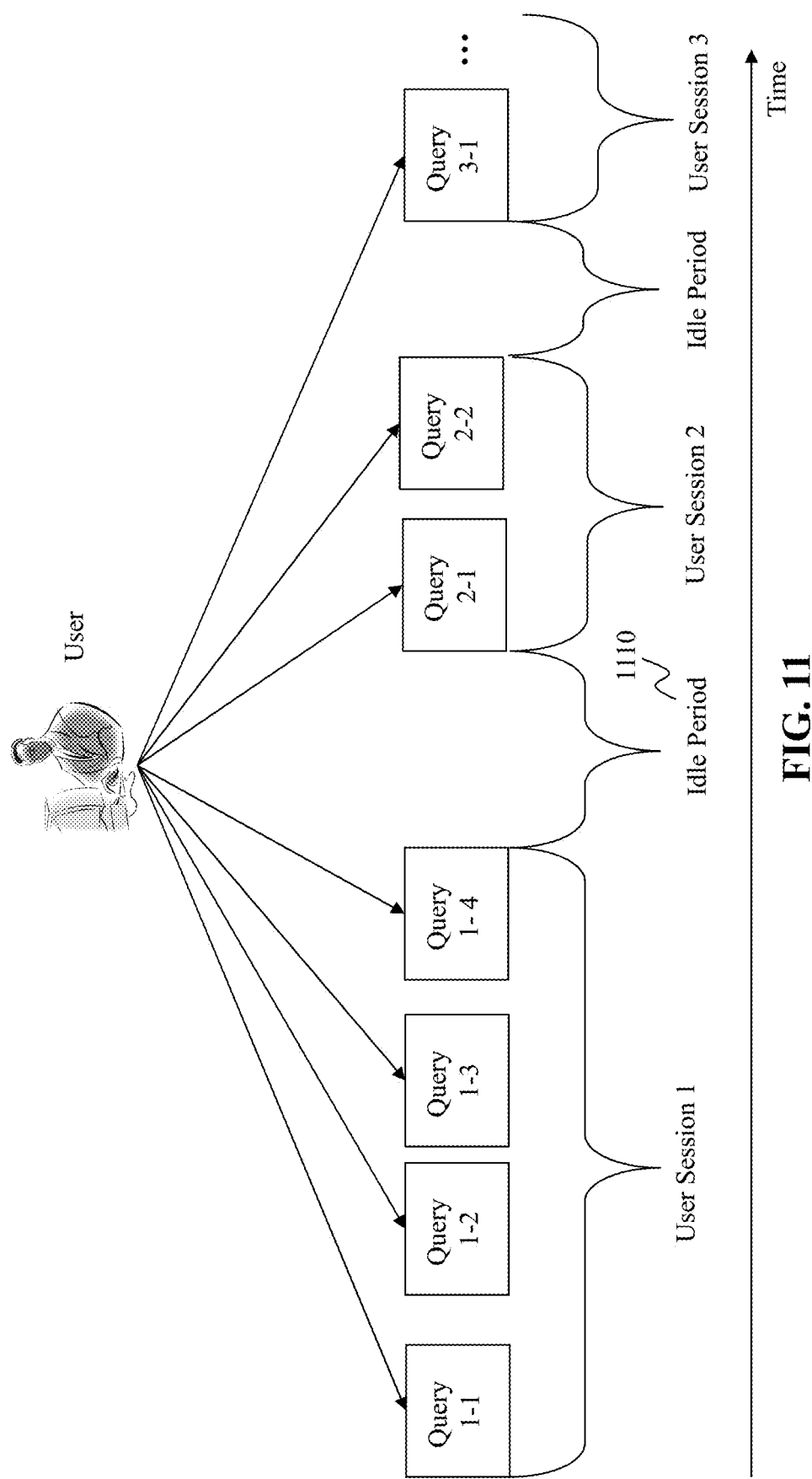
FIGS. 11-14 depicts exemplary user sessions, according to different embodiments of the present teaching.

FIG. 11 depicts exemplary user sessions, according to an embodiment of the present teaching. According to the session separation mode illustrated in FIG. 11, the user sessions are separated based on idle period between two consecutive queries. In particular, after a current search query is received, the idle time between the current search query and the immediate previous query received from the same user is compared against a predetermined threshold value at the user session determining unit 340 to determine whether the two consecutive queries belong to the same user session. If the idle time does not exceed the threshold value, the current query is recorded in the current user session. Otherwise, a new user session is created, and the current query is recorded as the first query of the new user session. For example in FIG. 11, queries 1-1, 1-2, 1-3, 1-4 belong to one user session 1, and queries 2-1, 2-2 belong to another user session 2, because the idle period 1110 between the consecutive queries 1-4 and 2-1 exceeds a predetermined threshold value.

Figure 12:
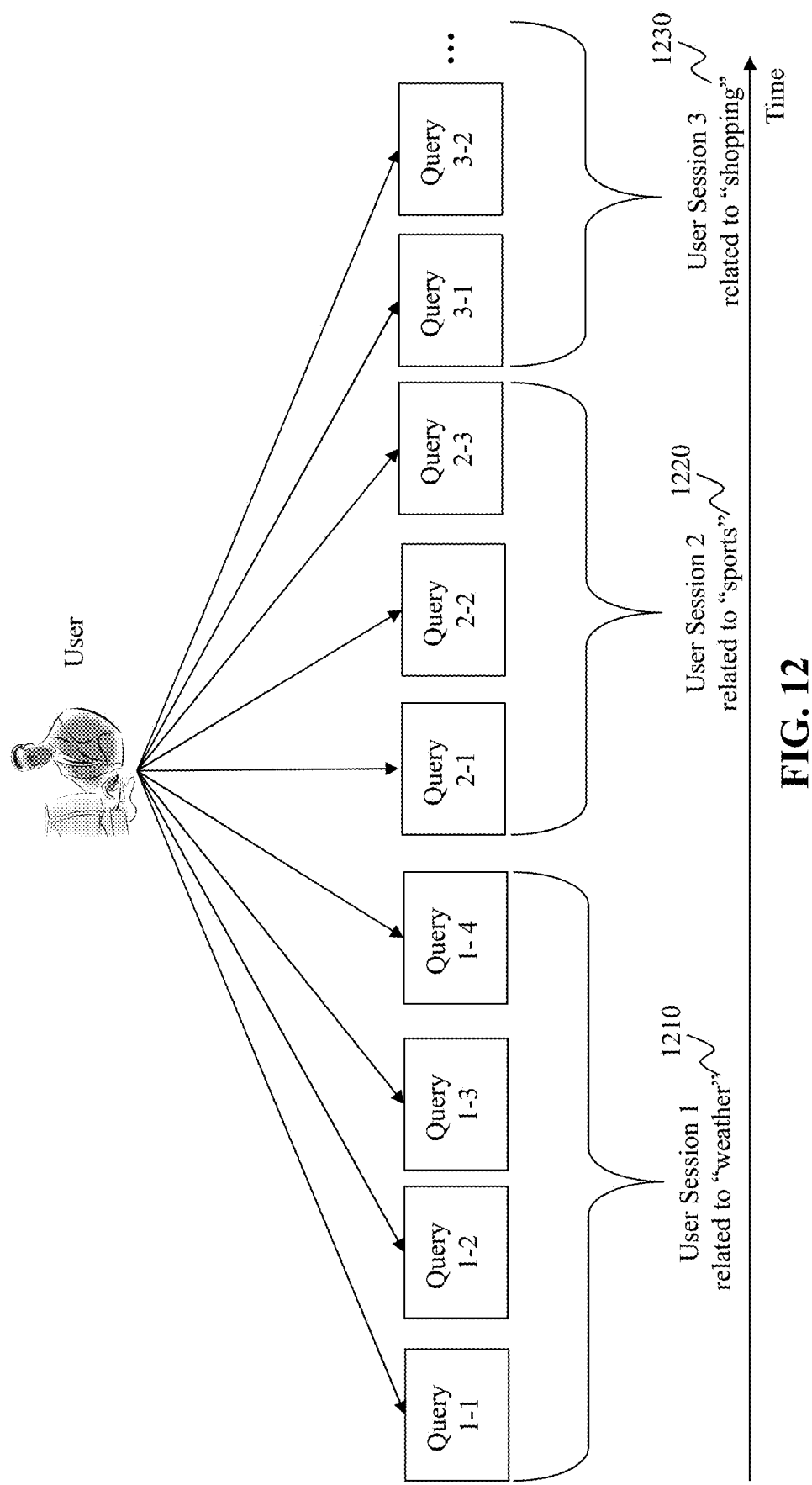

FIG. 12 depicts exemplary user sessions, according to another embodiment of the present teaching. According to the session separation mode illustrated in FIG. 12, the user sessions are separated based on similarity of the related topics of two consecutive queries. Each query can be analyzed and determined to be associated with a related topic, e.g., weather, sports, news, shopping, etc. After a current search query is received, the related topics of both the current search query and the immediate previous query received from the same user are compared to each other to determine a similarity at the user session determining unit 340. If the similarity is greater than a predetermined threshold value, the current query is recorded in the current user session. Otherwise, a new user session is created, and the current query is recorded as the first query of the new user session. For example in FIG. 12, queries 1-1, 1-2, 1-3, 1-4 belong to one user session 1, and queries 2-1, 2-2, 2-3 belong to another user session 2, because the queries in the user session 1 are related to a topic "weather" 1210 but the queries in the user session 2 are related to another topic "sports" 1220.

Figure 13:
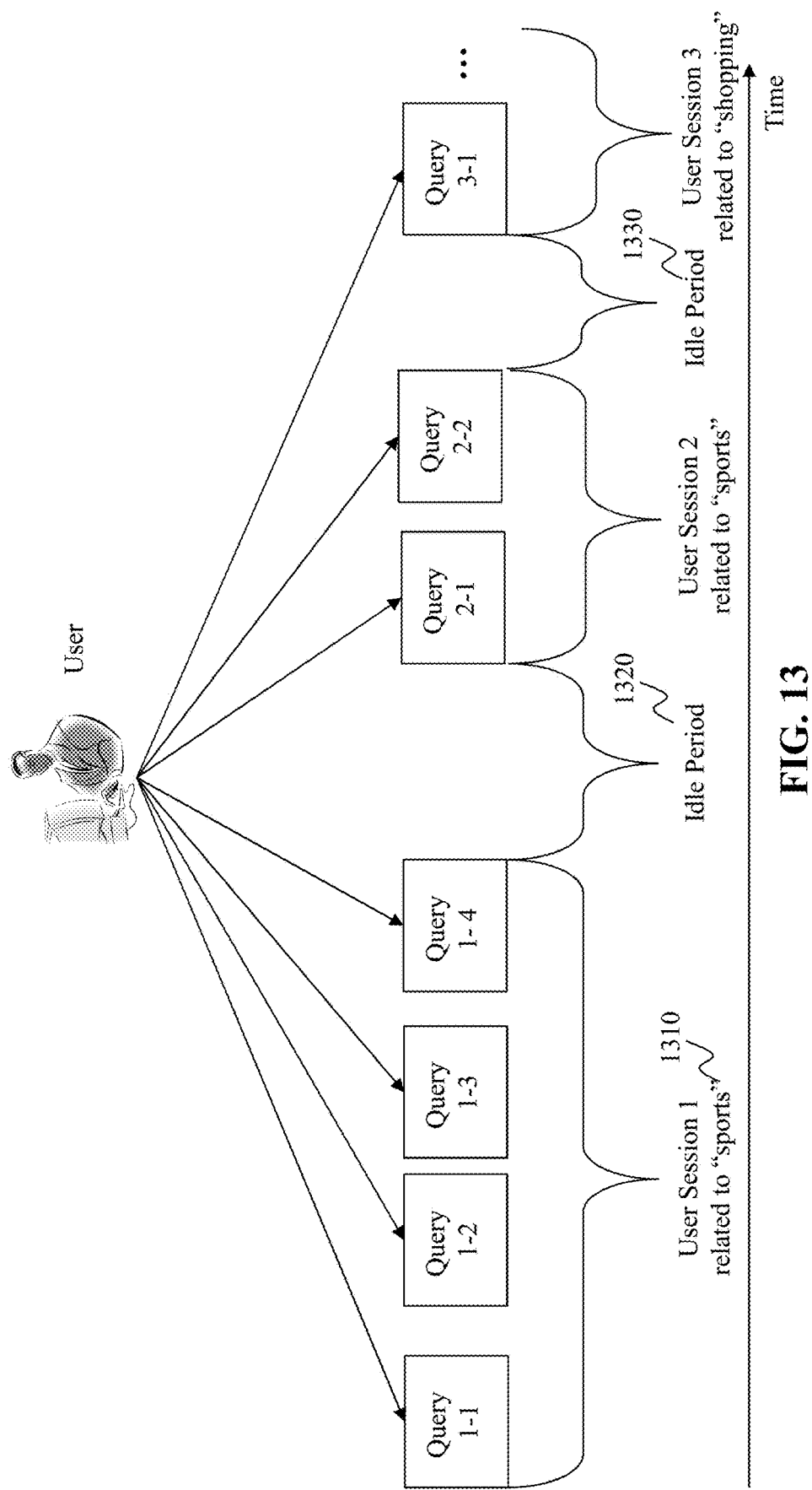

FIG. 13 depicts exemplary user sessions, according to yet another embodiment of the present teaching. According to the session separation mode illustrated in FIG. 13, the user sessions are separated based on both idle period between two consecutive queries and similarity of the related topics of two consecutive queries. For example, as shown in FIG. 13, queries 1-1, 1-2, 1-3, 1-4 belong to one user session 1, and queries 2-1, 2-2 belong to another user session 2, although all queries in the user session 1 and the user session 2 are related to the same topic "sports" 1310. This is because the idle period 1320 between the consecutive queries 1-4 and 2-1 exceeds a predetermined threshold value.

Figure 14:
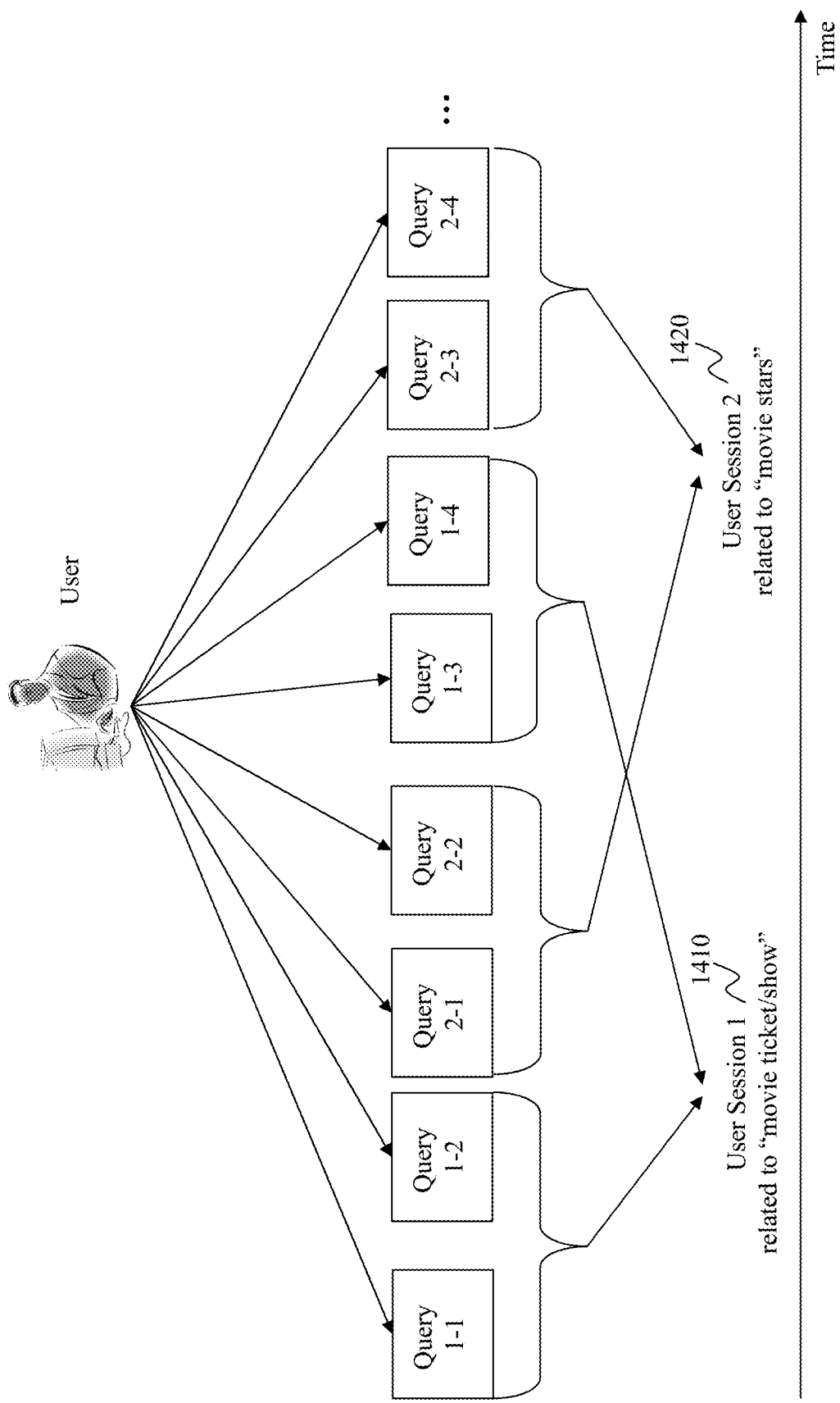

FIG. 14 depicts exemplary user sessions, according to still another embodiment of the present teaching. According to the session separation mode illustrated in FIG. 14, a user session can have interleaved queries with common related topics. For example, as shown in FIG. 14, queries 1-1, 1-2, 1-3, 1-4 belong to one user session 1, 1510, and queries 2-1, 2-2, 2-3, 2-4 belong to another user session 2, 1520, although queries 2-1, 2-2 were submitted between query 1-2 and query 1-3. This is because queries 1-1, 1-2, 1-3, 1-4 may be related to a common topic or information need from the user, while queries 2-1, 2-2, 2-3, 2-4 may be related to another common topic or information need from the user. For example, a user could search for movie ticket or show information in queries 1-1, 1-2 and some movie stars in a movie interesting to the user in queries 2-1, 2-2; then the user searches again for more movie ticket or show information in queries 1-3, 1-4 and some other movie stars in queries 2-3, 2-4. In this example, queries 1-1, 1-2, 1-3, 1-4 are all related to ticket/show information about some particular movie, while queries 2-1, 2-2, 2-3, 2-4 are all related to movie stars' information that is not limited to a particular movie. This may happen frequently on a browser of e.g. a desktop, a laptop, a tablet, or a smartphone, with multi-tab setting where a user can search for different information simultaneously through multiple browser tabs.

It is understood that, in other examples, instead of using idle time or similarity of related topics to define a user session, a user session may be defined in other manners, e.g., by a predetermined time window. The predetermined time window may be e.g., 10 minutes or 30 minutes. That is, any queries entered within the predetermined time window after the user accesses the search application are considered as in the same user session, and the user session ends when the predetermined time window ends.

Back to FIG. 3, after the user 310 submits a query, the user session determining unit 340 may receive the query directly via the network 120 as in the environment 100 or receive the query forwarded by the search engine system 130 as in the environment 200. In this example, the user session determining unit 340 can determine whether the query belongs to a new user session or the current user session, based on any of the session separation modes illustrated in FIGS. 11-13. After determining a user session for the query, the user session determining unit 340 may send user session information to both the user activity detection unit 320 for monitoring user activities and/or the user satisfaction score determiner 350 for determining a user satisfaction score.

In one embodiment, the user session determining unit 340 may send a detection period to the user activity detection unit 320 so that the user activity detection unit 320 can monitor user activities from the user 310 within the detection period. A detection period can be determined based on user session information so that the user activity detection unit 320 can monitor user activities when users are most active, and stop monitoring when users are relatively inactive.

The user activity detection unit 320 in this example may monitor user activities from different users. The user activities may include either an action or inaction from a user. An action from a user may include pressing, swiping, clicking, rotating, zooming, scrolling, etc. An example of inaction from a user may be a dwell time within which the user does not provide any input. In addition to traditional user activities like mouse clicking or keyboard typing related to links to search results provided to a user, more user activities related to manipulation of a content item provided to a user can be detected and utilized for evaluating user satisfaction. For example, FIGS. 16-19 illustrate exemplary user activities with respect to content items, according to different embodiments of the present teaching.

Figure 16:
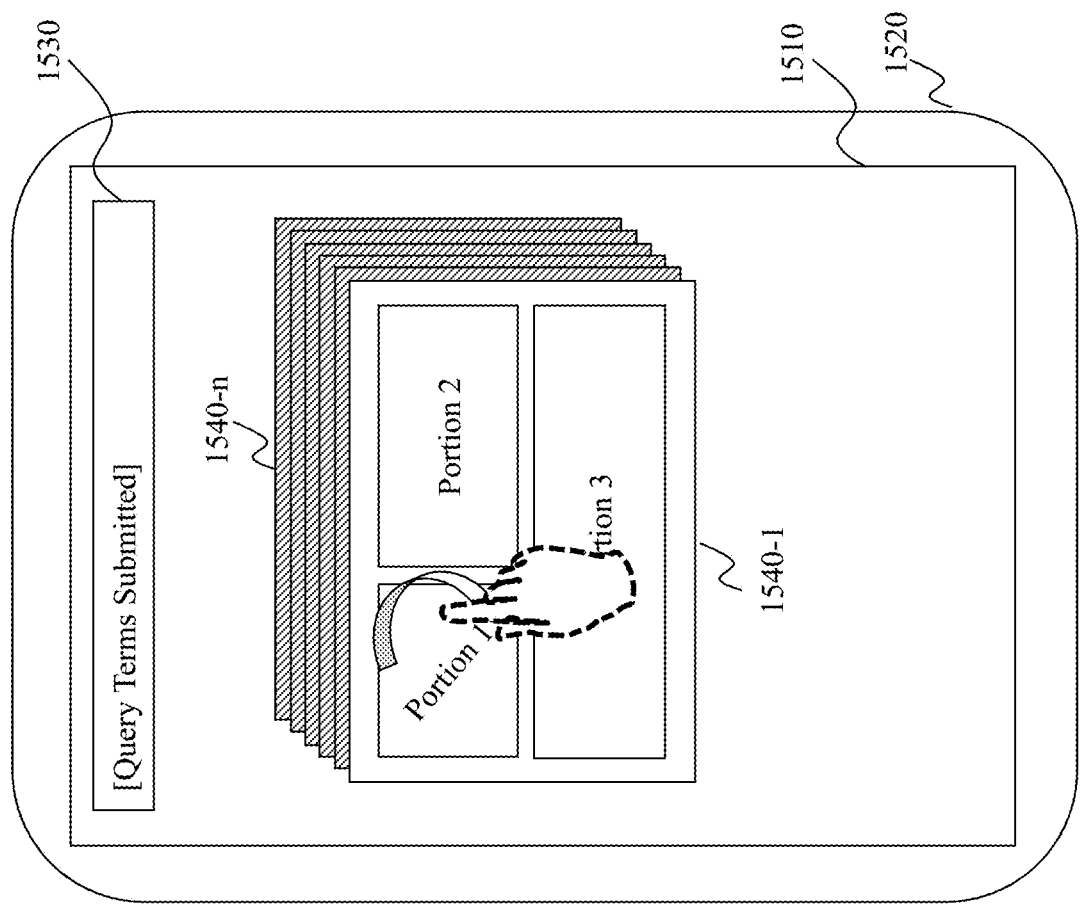
FIGS. 16-19 illustrate exemplary user activities with respect to content items, according to different embodiments of the present teaching.

FIG. 16 illustrates a rotate action being performed with respect to content in Portion 1 of the information card 1540-1. In an embodiment, the depicted rotate action is an action that triggers a modification of the information card 1540-1 (or the Portion 1 content) such that an instance of the information card 1540-1 (or the Portion 1 content) is modified and then stored for subsequent presentation of the information card 1540-1. In one use case, for example, the modified version of the information card 1540-1 (or the rotated Portion 1 content) is presented to the user (instead of the original version of the information card 1540-1) in response to a subsequent user query. In another embodiment, the depicted rotate action is an action that triggers a modification of the presentation of the information card 1540-1 (or the Portion 1 content) such that a subsequent presentation of the information card 1540 comprises the original version of the information card 1540-1 (or the non-rotated Portion 1 content).

Figure 17:
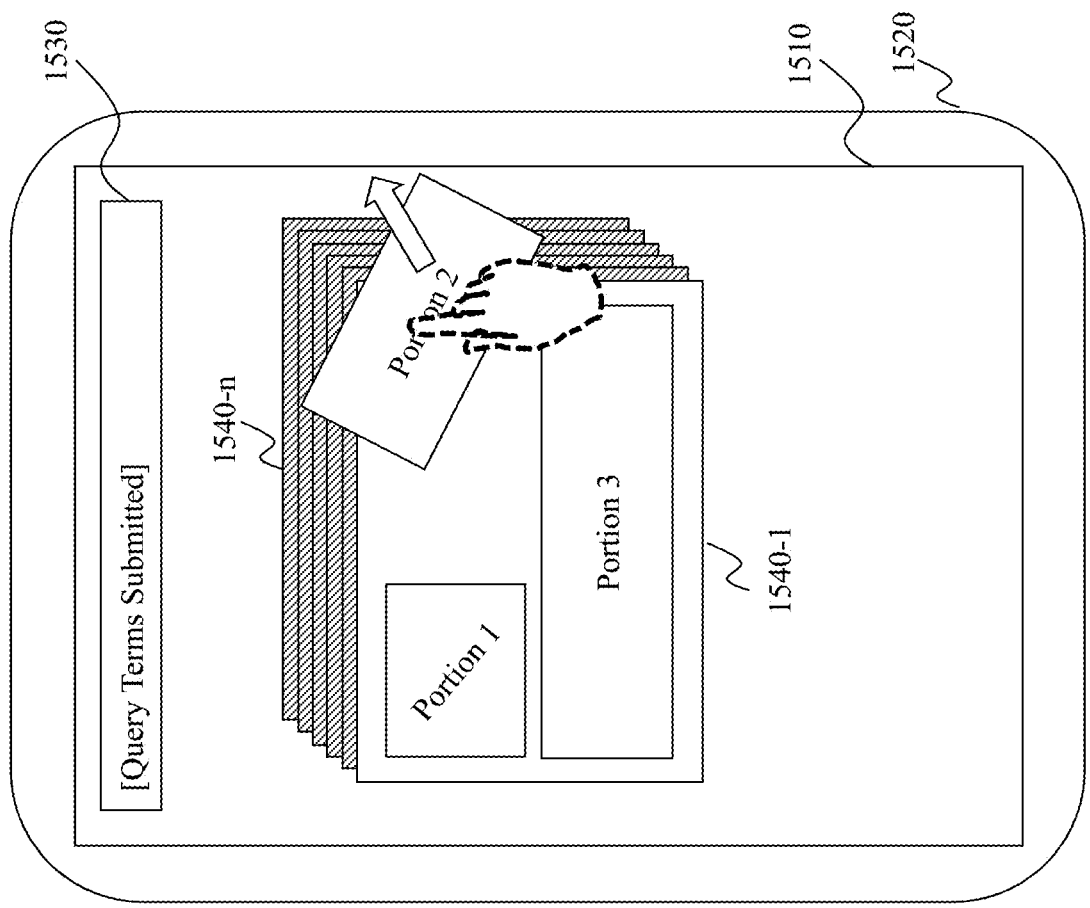

FIG. 17 illustrates a removal action being performed with respect to content in Portion 2 of the information card 1540-1. In an embodiment, the depicted removal action is an action that triggers a modification of the information card 1540-1 (or the Portion 1 content) such that an instance of the information card 1540-1 (or the Portion 1 content) is modified and then stored for subsequent presentation of the information card 1540-1. In one scenario, for example, the modified version of the information card 1540-1 (e.g., the information card 1540-1 without the Portion 2 content) is presented to the user (instead of the original version of the information card 1540-1) in response to a subsequent user query. In another embodiment, the depicted removal action is an action that triggers a modification of the presentation of the information card 1540-1 (or the Portion 1 content) such that a subsequent presentation of the information card 1540 comprises the original version of the information card 1540-1 (e.g., the information card 1540-1 with the Portion 2 content).

Figure 18:
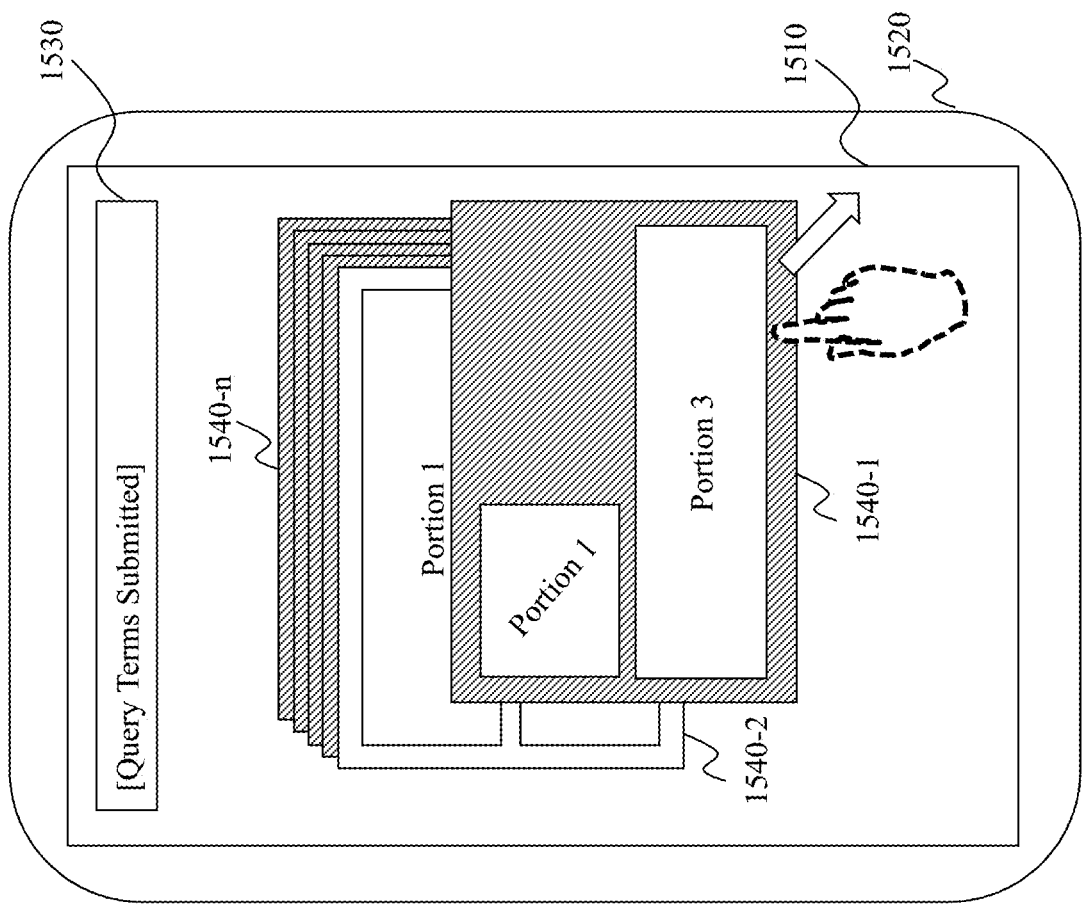

FIG. 18 illustrates a removal action being performed to remove the information card 1540-1 from the presentation of the stack of information cards 1540. The removal action may, for example, comprise a swipe action, a drag-and-drop action, or other action that triggers the removal of the information card 1540-1 from the presentation of the stack of information cards 1540. After the removal action in FIG. 18 is performed on the information card 1540, the information card 1540-2 is presented to the user on top of the stack of information cards 1540-n such that the contents of the information card 1540-2 (e.g., within portions of the information card 1540-2) is in view on the user interface 1510.

Figure 19:
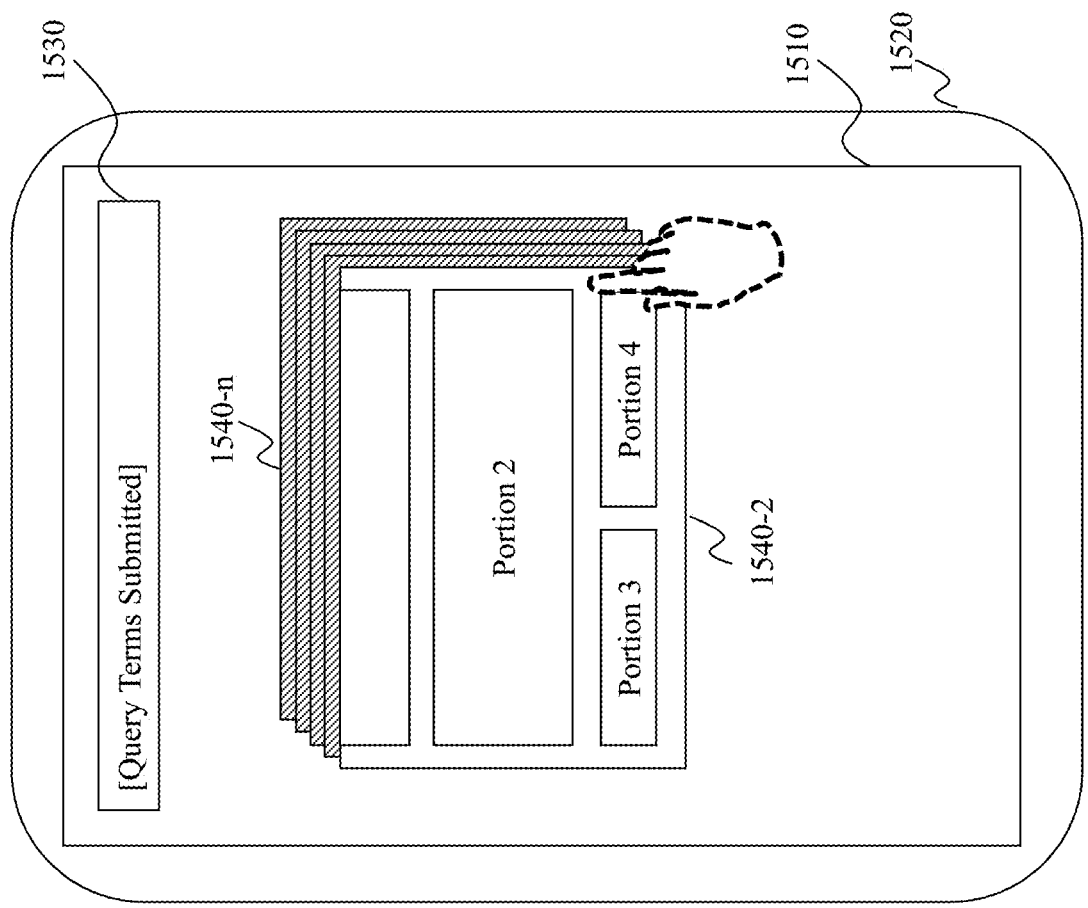

FIG. 19 illustrates a scroll action being performed with respect to the information card 1540-2. As shown, the user performs the scroll action on information card 1540-2 such that the content of Portions 2, 3, and 4 of the information card 1540-2 is in view on the user interface 1510 (as opposed to the content of Portions 1 and 2 of the information card 1540-2). It is understood that, although exemplary user activities are described herein (e.g., with respect to FIGS. 15-19), they are by ways of example rather than limitation. Any other appropriate user activity can be performed, monitored, detected, and/or utilized to provide information related to user engagement with content items within the scope of the present teaching. Other examples comprise moving a portion of a content item from one position of the content item to another position of the content item, adding content to the content item, etc. In some embodiments, each of the user activities described with respect to FIGS. 15-19 are monitored so that user engagement with the information cards 1540 may be analyzed based on those user activities.

Back to FIG. 3, a detection period in this example is received from the user session determining unit 340, based on user session information. In another example, a detection period may be predetermined to be an extended period of time, e.g., one month, which can cover a significant amount of user activities from many users. In yet another example, a detection period may be received from the user engagement evaluation unit 330 and determined based on previous measurements of user engagement.

After detecting a user activity from a user, the user activity detection unit 320 may determine user session information related to the user activity, e.g., user session identification (ID) the user activity is associated with. The user activity detection unit 320 may send information related to the user activity and the user session to the user engagement evaluation unit 330 for evaluating user engagement.

The user engagement evaluation unit 330 in this example measures user engagement based on information related to user activity and user session received from the user activity detection unit 320. A level of user engagement indicates an extent to which a user is engaged or interested by a content item, e.g., the content item that is provided to the user in response to a query submit by the user. While a user session may include multiple queries, a user engagement score indicating a user's interest on one query in the user session may not reflect the user's satisfaction with respect to the entire user session, especially when there are many information needs from the user and when the user has complex and rich interaction activities during the user session. While user satisfaction with a query can be evaluated in accordance with various embodiments of the present teaching, user satisfaction with respect to an entire session can be more desirable in practice. In one embodiment, a user may be satisfied with a search result for one query in a user session, but may be unsatisfied with the entire user session and hence the search service because the user is disappointed by results for most of the other queries in the user session. In another embodiment, whether a user is satisfied with one query can be reflected by the user's activities regarding other queries in the same user session. For example, when a search result regarding "Hillary Clinton" is provided to a user in response to a query "Clinton" received from the user, whether the user is satisfied with the search result may be indicated by the next query input by the user immediately after receiving the search result. If the next query is "Bill Clinton", the user may not be very satisfied with the search result regarding "Hillary Clinton". But if the next query is "first female president" or "election 2016", the user may be satisfied with the search result regarding "Hillary Clinton". Therefore, it is often more desirable to know whether a user is satisfied with respect to a user session that includes one or more related queries. The user engagement evaluation unit 330 in this example sends user engagement information to the user satisfaction score determiner 350 for evaluating a user satisfaction with respect to an entire user session.

The user satisfaction score determiner 350 in this example receives user engagement information from the user engagement evaluation unit 330 and user session information from the user session determining unit 340, and generates or updates a user satisfaction score associated with a user session. The user satisfaction score determiner 350 may analyze the user engagement information to obtain a user session ID associated with the user engagement information. The user satisfaction score determiner 350 may then retrieve user session information from the user session determining unit 340 based on the user session ID. The user engagement information can include information related to user activities related to a content item or a search result and can be utilized by the user satisfaction score determiner 350 to estimate user satisfaction by generating a user satisfaction score based on a satisfaction evaluation model. The satisfaction evaluation model may be determined based on one or more user satisfaction metrics including, e.g., click through rate (CTR), dwell time, time to first click, number of shares, number of tweets, number of favorites, etc. The satisfaction evaluation model can utilize different metrics with different weights based on e.g. topic of the current user session, information need of the user in the current user session, user activities during the current user session, historical user activities for a previous user session similar to the current user session, and/or personal information of the user.

In one example, the score generated by the user satisfaction score determiner 350 related to a user session may be a binary number "1" or "0" to indicate whether the user is satisfied with the user session. In another example, the score generated by the user satisfaction score determiner 350 related to a user session may be a probability between 0 and 1 to indicate how likely the user is satisfied with the user session, e.g., 80% satisfied. In yet another example, the score generated by the user satisfaction score determiner 350 related to a user session may be a real-valued score indicating a degree of user's satisfaction with respect to the user session.

In one embodiment, the user satisfaction score determiner 350 may also generate a confidence level associated with the user satisfaction score. The confidence level indicates how confident that the user satisfaction score can be utilized to predict the user's real satisfaction. In one example, when user activities detected include many user actions indicating that the user shared the result in the user session or marked a content item in the user session as favorite, the confidence level may be relatively high because the user actions reflect explicit intent of the user. In another example, when user activities detected include very few user actions in the user session without any explicit input from the user, the confidence level may be relatively low because it is more difficult to predict the user's satisfaction level with less information from the user. The confidence level may also depend on different information needs from a user. For example, for queries related to an information need "weather", a small amount of user activities (e.g. only some scrolling actions) may already provide the user session determining unit 340 enough confidence that the user is satisfied, while too many query reformulations for this kind of information need session is not a good sign regarding user satisfaction.

The user satisfaction score determiner 350 may send the one or more scores to the user satisfaction report generation unit 360 for generating a user satisfaction report. The user satisfaction report generation unit 360 in this example receives a score associated with a user session from the user satisfaction score determiner 350 and generates user satisfaction information based on the score. In one example, a report can be sent daily from the user satisfaction report generation unit 360 to the search engine system 130 to indicate user satisfaction level of each user with respect to each user session. The search engine system 130 may utilize the report to improve its search service, analyze users' intent, and/or propose new products to attract more users. The report can also be sent to a user for the user to verify or confirm the satisfaction level by giving feedbacks. In another example, for a same user, different user satisfaction reports can be generated for different types of information need of the user, as the user may be satisfied with some sessions, but not satisfied with other sessions.

Figure 4:
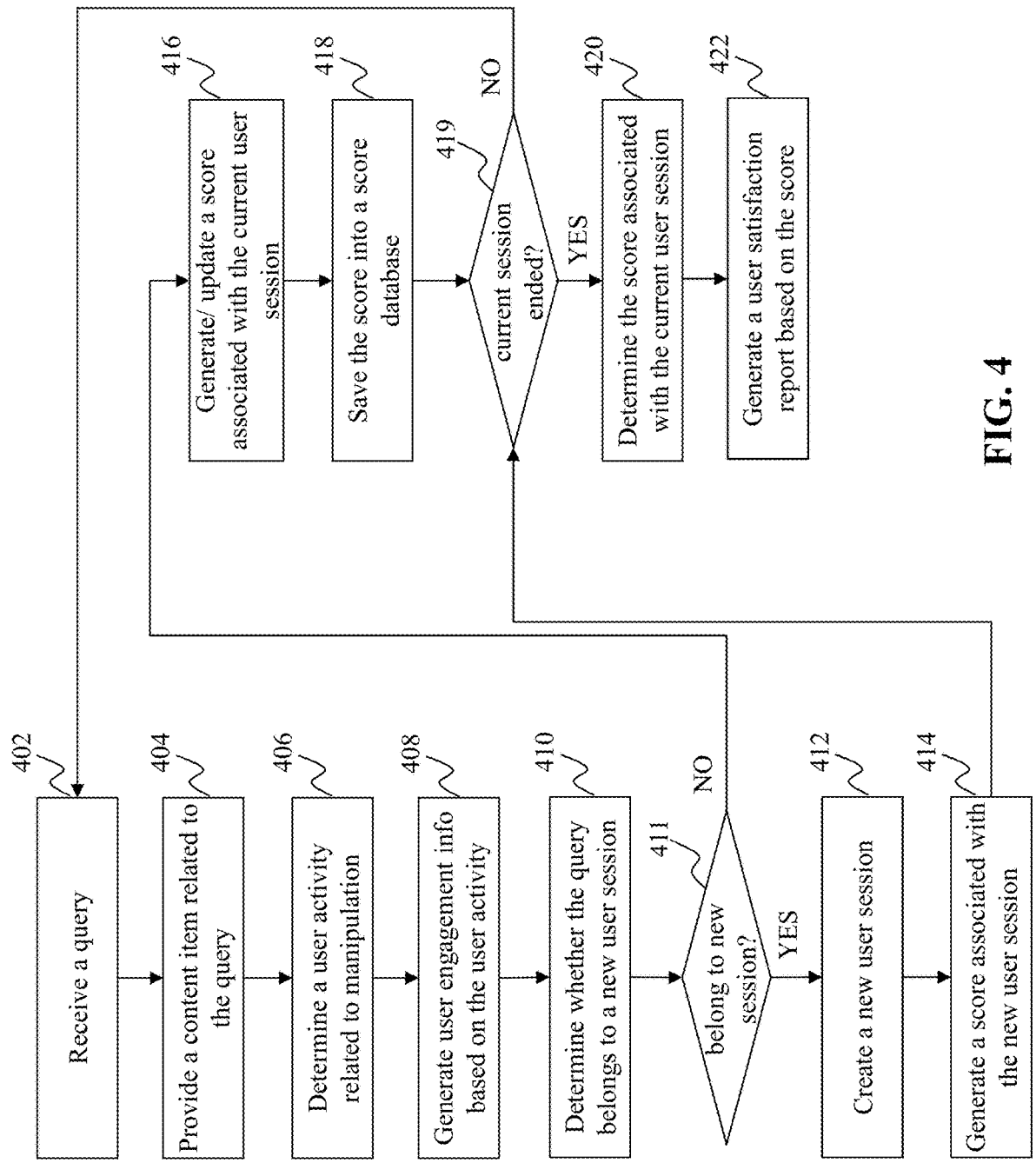
FIG. 4 is a flowchart of an exemplary process for evaluating user satisfaction with respect to a user session, according to an embodiment of the present teaching.

FIG. 4 is a flowchart of an exemplary process for evaluating user satisfaction with respect to a user session, according to an embodiment of the present teaching. In one example, the exemplary process in FIG. 4 may be performed by the search engine system 130 and the user satisfaction assessment system 140 shown in FIG. 3. Starting at 402, a query is received from a user, e.g., by the search engine system 130. At 404, a content item related to the query is provided to the user, e.g., by the search engine system 130. Moving to 406, a user activity related to manipulation of the content item is obtained and determined, e.g., by the user activity detection unit 320 in the user satisfaction assessment system 140. At 408, user engagement information based on the user activity is generated, e.g., by the user engagement evaluation unit 330 in the user satisfaction assessment system 140. At 410, whether the query belongs to a new user session is determined, e.g., based on a user session separation mode at the user session determining unit 340. The result of 410 is checked at 411. If the query belongs to a new session, then a new user session is created at 412, a user satisfaction score associated with the new user session is generated at 414, and the process goes to 419. If the query does not belong to a new session and belongs to the current user session, then a user satisfaction score associated with the current user session is generated or updated at 416 based at least partially on the user activity, the score is saved into a score database at 418, and the process goes to 419. The score database may be located in the user satisfaction assessment system 140, e.g., in the user satisfaction score determiner 350 of the user satisfaction assessment system 140.

At 409, whether the current session has ended is checked, e.g. based on a user activity or a predetermined time threshold. If so, at 420, the user satisfaction score associated with the current user session can be determined and finalized, e.g., along with a confidence level associated with the score. Otherwise, the process goes back to 402. At 422, a user satisfaction report is generated based on the score.

It can be understood that, in accordance with various embodiments, at least some of the above mentioned steps in FIG. 4 may happen without following the sequence shown in FIG. 4. In one embodiment, some steps may happen after all queries from a user are received and/or after user activities are completely detected. For example, determining 410 whether a particular query or set of queries belongs to a new user session can happen off-line, long after all of the queries from this user have been input. Similarly, determining 410 whether a query belongs to the same user session as a previous query may involve reviewing all of the queries received from that user during a particular time period, including queries that may come after the query being considered.

Figure 5:
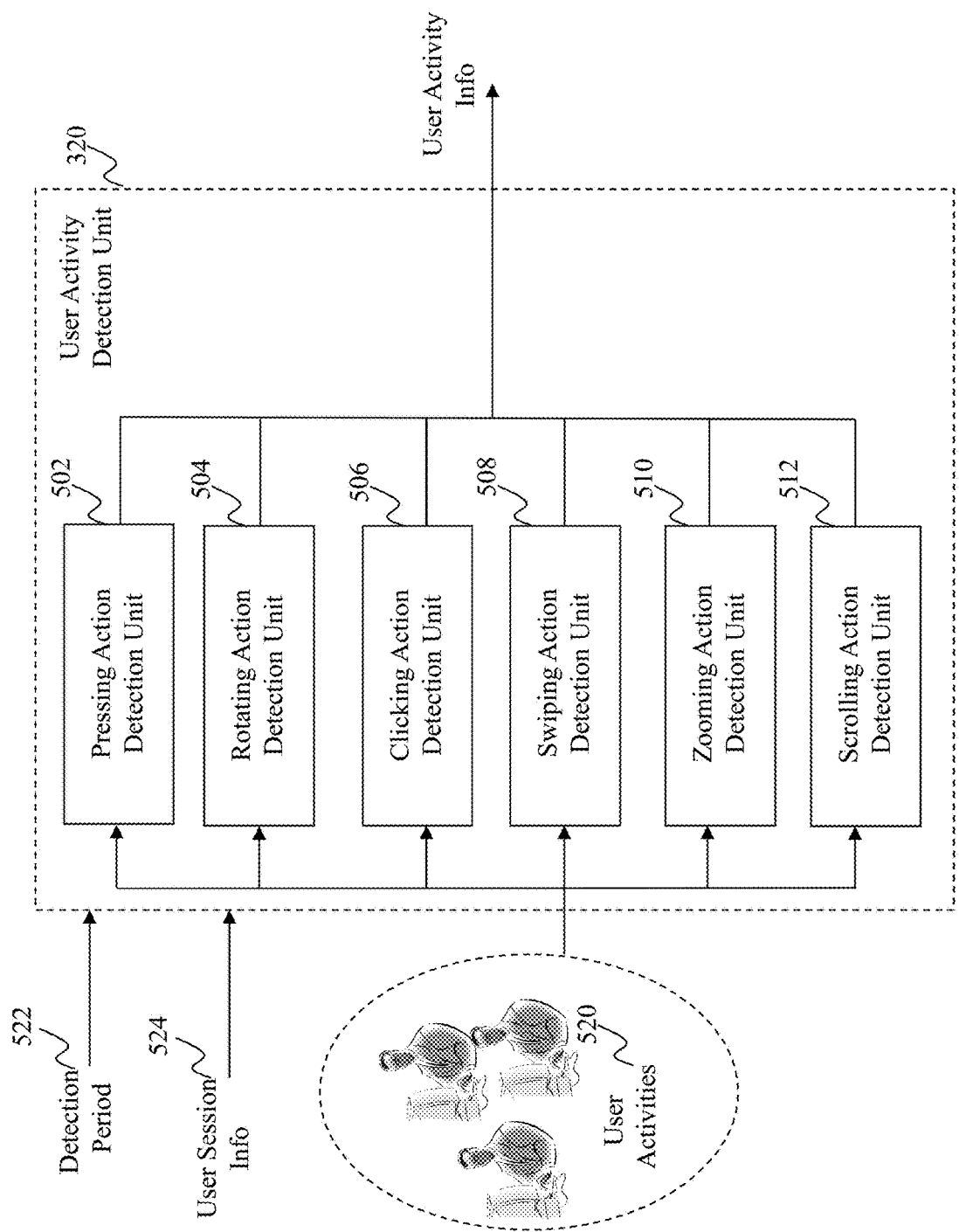
FIG. 5 illustrates an exemplary diagram of a user activity detection unit in a user satisfaction assessment system, according to an embodiment of the present teaching.

FIG. 5 illustrates an exemplary diagram of a user activity detection unit 320 in a user satisfaction assessment system, e.g. the user satisfaction assessment system 140 in FIG. 3, according to an embodiment of the present teaching. The user activity detection unit 320 in this example includes a pressing action detection unit 502, a rotating action detection unit 504, a clicking action detection unit 506, a swiping action detection unit 508, a zooming action detection unit 510, and a scrolling action detection unit 512. The pressing action detection unit 502 may be configured for detecting a pressing action performed by a user 520 on a touchscreen. For example, a pressing action can be detected when the user 520 presses down on the touchscreen for a period of time longer than a predetermined threshold before the user 520 releases the pressure. The rotating action detection unit 504 may be configured for detecting a rotating action performed by a user 520 on a touchscreen. For example, a rotating action can be detected when the user 520 presses and rotates a content item on the touchscreen before the user 520 releases the pressure, as illustrated in FIG. 16. The clicking action detection unit 506 may be configured for detecting a clicking action performed by a user 520 on a touchscreen. For example, a clicking action can be detected when the user 520 presses down on the touchscreen for a period of time shorter than a predetermined threshold before the user 520 releases the pressure. The swiping action detection unit 508 may be configured for detecting a swiping action performed by a user 520 on a touchscreen. For example, a swiping action can be detected when the user 520 presses down with a finger on the touchscreen and moves the finger on the surface of the touchscreen. The zooming action detection unit 510 may be configured for detecting a zooming action performed by a user 520 on a touchscreen. For example, a zooming action can be detected when the user 520 presses down with more than one finger at the same time on the touchscreen and swipes with at least one finger. The scrolling action detection unit 512 may be configured for detecting a scrolling action performed by a user 520. For example, a scrolling action can be detected when the user 520 moves or scrolls a scroll wheel on a computer mouse, a scrollable button on a laptop or smartphone, or a virtual scrollable icon on a touchscreen.

It can be understood that other user activities can be determined based on the user actions described above. For example, typing on the touchscreen can be detected when the user 520 is clicking on a corresponding zone on the touchscreen. For example, dwell time of the user 520 can be detected when none of the detection units in the user activity detection unit 320 detects any input from the user 520 for a period of time.

It can also be understood that more units related to user actions can be included in the user activity detection unit 320, e.g., units for detecting keyboard inputs and/or mouse inputs when the user 520 is using a desktop or laptop.

Each detection unit in the user activity detection unit 320 may detect a user activity within a predetermined or received detection period 522 and determine user session information 524 associated with the detected user activity. The user activity detection unit 320 may send to the user engagement evaluation unit 330 user activity information including information related to detected user activities and associated user session information.

Figure 6:
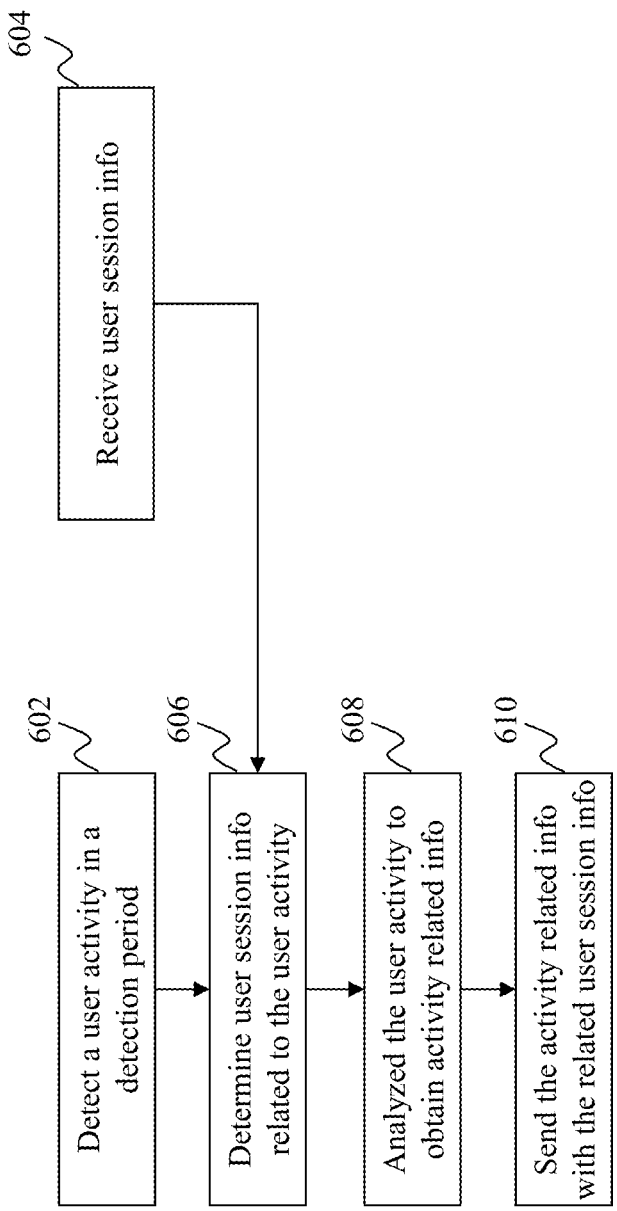
FIG. 6 is a flowchart of an exemplary process performed by a user activity detection unit, according to an embodiment of the present teaching.

FIG. 6 is a flowchart of an exemplary process performed by a user activity detection unit, e.g. the user activity detection unit 320 in FIG. 5, according to an embodiment of the present teaching. At 602, a user activity is detected in a detection period. At 604, user session information is received. Moving to 606, user session information that is related to the user activity is determined. At 608, the user activity is analyzed to obtain activity related information. At 610, the activity related information is sent to the user engagement evaluation unit 330 with the related user session information.

Figure 7:
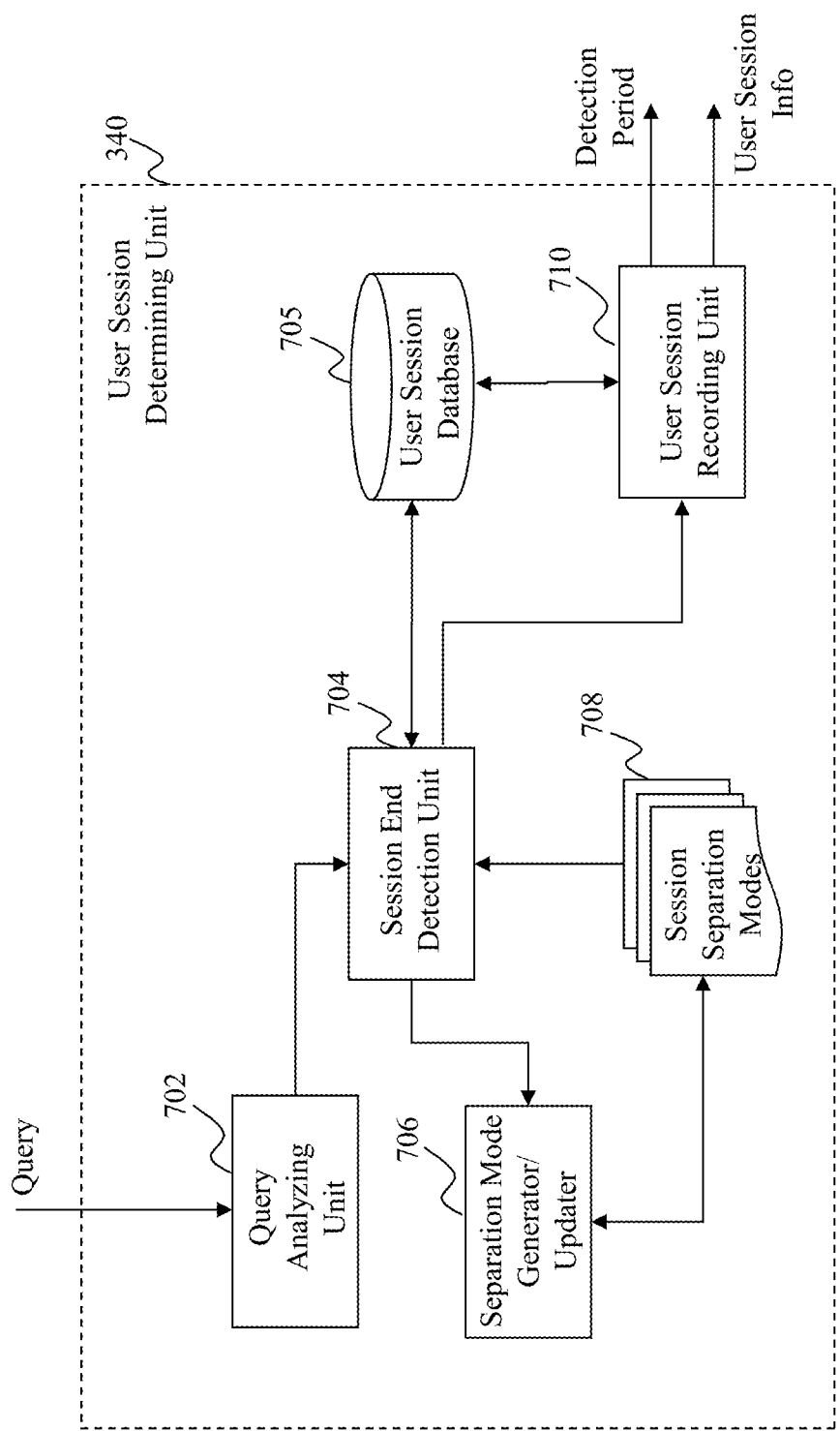
FIG. 7 illustrates an exemplary diagram of a user session determining unit in a user satisfaction assessment system, according to an embodiment of the present teaching.

FIG. 7 illustrates an exemplary diagram of a user session determining unit 340 in a user satisfaction assessment system, e.g., the user satisfaction assessment system 140, according to an embodiment of the present teaching. The user session determining unit 340 in this example includes a query analyzing unit 702, a session end detection unit 704, a separation mode generator/updater 706, and a user session recording unit 710. The query analyzing unit 702 can receive and analyze a query from a user to obtain query related information. The query related information may include topic related to the query, user information of the user, and/or a timestamp indicating when the query was received. The session end detection unit 704 in this example determines whether a query received at the query analyzing unit 702 belongs to a new user session or not, based on the query related information. The session end detection unit 704 can select one of session separation modes 708 stored in the user session determining unit 340, where each of the session separation modes 708 indicates a manner according to which a query can be assigned to a user session. In accordance with different session separation modes, one or more queries can be determined to be in a user session if the one or more queries are associated with similar topics, if an idle period of the user between any two consecutive queries of the one or more queries is less than a predetermined threshold, and/or if the one or more queries are received within a predetermined period of time from a start of the user session. In one embodiment, user sessions may have interleaved queries as shown in FIG. 14. A session separation mode may be generated or updated by the separation mode generator/updater 706, based on an instruction from the session end detection unit 704. The instruction may be sent by the session end detection unit 704 when e.g. the threshold related to similarity between two consecutive queries should be lowered because it is so high that too many user sessions are generated as the similarity threshold is very difficult to exceed.

According to the selected session separation mode, the session end detection unit 704 may determine which user session a query belongs to, based on some user session information retrieved from a user session database 705 in the user session determining unit 340. The user session database 705 can store information related to user session including information about the queries in the user session and the corresponding users.

After the session end detection unit 704 determines a user session to which the query belongs to, the user session recording unit 710 may record the query in the user session. In one example, when the query belongs to a new user session, the user session recording unit 710 creates the new user session, records the query as the first query in the new user session, and stores the new user session in the user session database 705. In another example, when the query belongs to the current user session, the user session recording unit 710 retrieves the current user session from the user session database 705, records the query in the current user session, and stores the current user session in the user session database 705. For each query received, the user session recording unit 710 may determine and send user session information related to the query to the user activity detection unit 320 and/or the user satisfaction score determiner 350. In one example, the user session recording unit 710 may also determine and send a detection period related to the query to the user activity detection unit 320.

Figure 8:
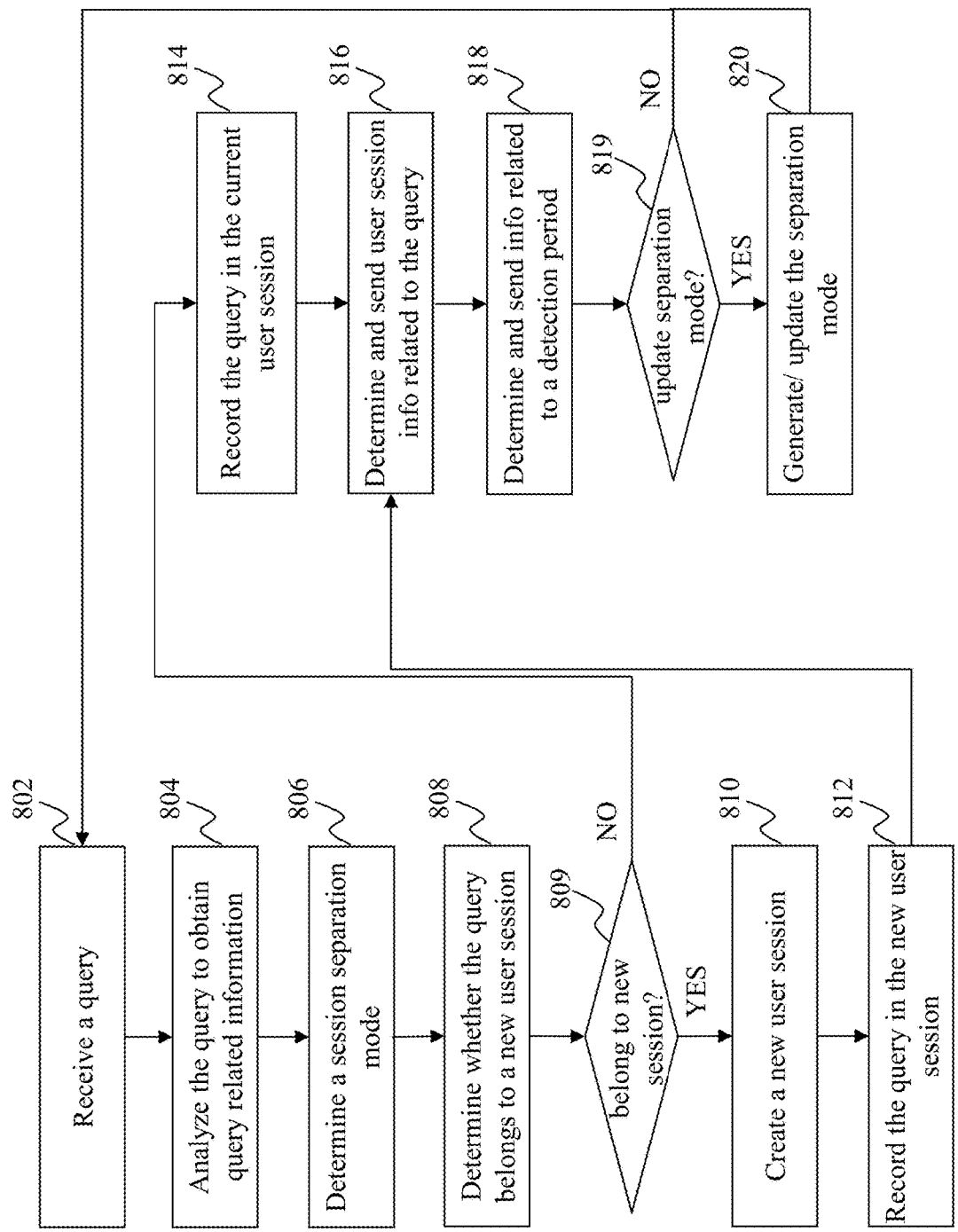
FIG. 8 is a flowchart of an exemplary process performed by a user session determining unit, according to an embodiment of the present teaching.

FIG. 8 is a flowchart of an exemplary process performed by a user session determining unit, e.g. user session determining unit 340, according to an embodiment of the present teaching. Starting at 802, a query is received. At 804, the query is analyzed to obtain query related information. At 806, a session separation mode is determined. At 808, whether the query belongs to a new user session is determined according to the session separation mode. The result of 808 is checked at 809. If the query belongs to a new session, then a new user session is created at 810, the query is recorded in the new user session at 812, and the process goes to 816. If the query does not belong to a new session and belongs to the current user session, then the query is recorded in the current user session at 814, and the process goes to 816.

Moving to 816, user session information related to the query is determined and sent, e.g., to the user activity detection unit 320 and/or the user satisfaction score determiner 350. Optionally at 818, information related to a detection period can be determined and sent to the user activity detection unit 320. At 819, whether a session separation mode needs to be generated or updated is checked. If so, the separation mode is generated or updated at 820 and the process goes back to the 802. Otherwise, the process directly goes back to the 802.

It can be understood that, in accordance with various embodiments, at least some of the above mentioned steps in FIG. 8 may happen without following the sequence shown in FIG. 8. In one embodiment, some steps may happen after all queries from a user are received and/or after user activities are completely detected. For example, determining 808 whether a particular query or set of queries belongs to a new user session can happen off-line, long after all of the queries from this user have been input. Similarly, determining 808 whether a query belongs to the same user session as a previous query may involve reviewing all of the queries received from that user during a particular time period, including queries that may come after the query being considered.

Figure 9:
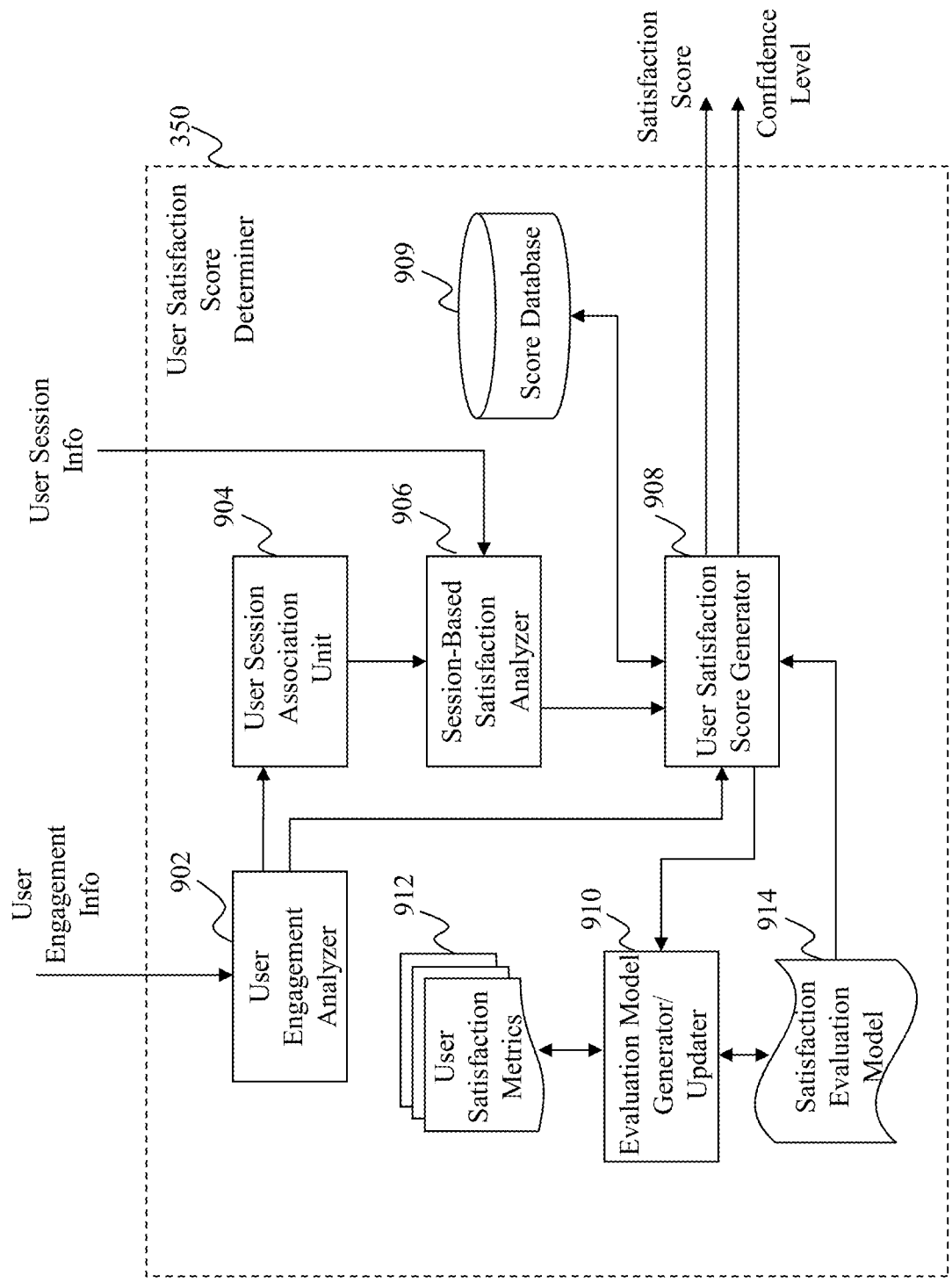
FIG. 9 illustrates an exemplary diagram of a user satisfaction score determiner in a user satisfaction assessment system, according to an embodiment of the present teaching.

FIG. 9 illustrates an exemplary diagram of a user satisfaction score determiner 350 in a user satisfaction assessment system, e.g., the user satisfaction assessment system 140, according to an embodiment of the present teaching. The user satisfaction score determiner 350 in this example includes a user engagement analyzer 902, a user session association unit 904, a session-based satisfaction analyzer 906, a user satisfaction score generator 908, and an evaluation model generator/updater 910. The user engagement analyzer 902 in this example is configured for receiving and analyzing user engagement information to obtain e.g. information related to user session. The user session association unit 904 may determine a user session ID associated with the user engagement information based on the analyzed user engagement information including information related to user session. The session-based satisfaction analyzer 906 may receive or retrieve user session information based on the user session ID, e.g. from the user session determining unit 340 and analyze the user session information to obtain e.g. topic of the user session, information need of the user in the user session, and/or personal information of the user. The session-based satisfaction analyzer 906 may send the analyzed user session information associated with the user engagement information to the user satisfaction score generator 908 for generating a user satisfaction score.

The user satisfaction score generator 908 may generate a user satisfaction score if there is no score existing for the current user session or update an existing user satisfaction score associated with the current user session, based at least partially on the analyzed user session information from the session-based satisfaction analyzer 906 and/or the user engagement information from the user engagement analyzer 902. The user satisfaction score indicates the user's satisfaction level with respect to the user session. The user satisfaction score may be generated based on a satisfaction evaluation model 914 in the user satisfaction score determiner 350. The satisfaction evaluation model 914 may be generated or updated by the evaluation model generator/updater 910 based on one or more user satisfaction metrics 912. The one or more user satisfaction metrics 912 may include, e.g., CTR, dwell time, time to first click, number of zooming actions, number of clicking actions, number of shares, number of tweets, number of favorites, etc. The evaluation model generator/updater 910 can utilize different metrics with different weights to generate the satisfaction evaluation model 914. The satisfaction evaluation model 914 may be updated by the evaluation model generator/updater 910 based on an instruction from the user satisfaction score generator 908. The instruction may include information related to e.g. topic of the current user session, information need of the user in the current user session, user activities during the current user session, historical user activities for a previous user session similar to the current user session, and/or personal information of the user. The instruction may be sent by the user satisfaction score generator 908 when the scores generated based on the satisfaction evaluation model 914 are always in the lowest end of a possible range of the user satisfaction score. For example, most scores related to different user sessions generated are between 1% and 2% while the possible range of a score is from 0% to 100%. In this case, it is difficult to distinguish user satisfaction between different user sessions and thus the model should be updated to avoid this accordingly.

Once a user satisfaction score associated with the current user session is generated, it can be saved into a score database 909 in the user satisfaction score determiner 350 by the user satisfaction score generator 908. The user satisfaction score generator 908 may determine whether the current user session has ended or not, e.g. based on the user session information from the session-based satisfaction analyzer 906. If the current user session has ended, the user satisfaction score for the current user session can be finalized and sent to the user satisfaction report generation unit 360 for generating a user satisfaction report. For example, different user satisfaction reports can be generated based on user satisfaction scores for different user sessions associated with a same user, as the user may be satisfied with some sessions, but not satisfied with other sessions. If the current user session has not ended, the user satisfaction score generator 908 may wait for more user engagement information and/or user session information to update the user satisfaction score before it can be finalized.

In one embodiment, the user satisfaction score generator 908 may also generate a confidence level associated with the user satisfaction score and send the confidence level to the user satisfaction report generation unit 360 together with the associated user satisfaction score. The confidence level indicates how confident that the user satisfaction score can be utilized to predict the user's real satisfaction. In one example, when user activities detected include many user actions indicating that the user shared the result in the user session or marked a content item in the user session as favorite, the confidence level may be relatively high because the user actions reflect explicit intent of the user. In another example, when user activities detected include very few user actions in the user session without any explicit input from the user, the confidence level may be relatively low because it is more difficult to predict the user's satisfaction level with less information from the user. The confidence level may also depend on different information needs from a user. For example, a high confidence level can be obtained with only a small amount of user activities regarding a user session related to "weather", while a high confidence level can only be obtained with a large amount of user activities regarding a user session related to "civil war history".

Figure 10:
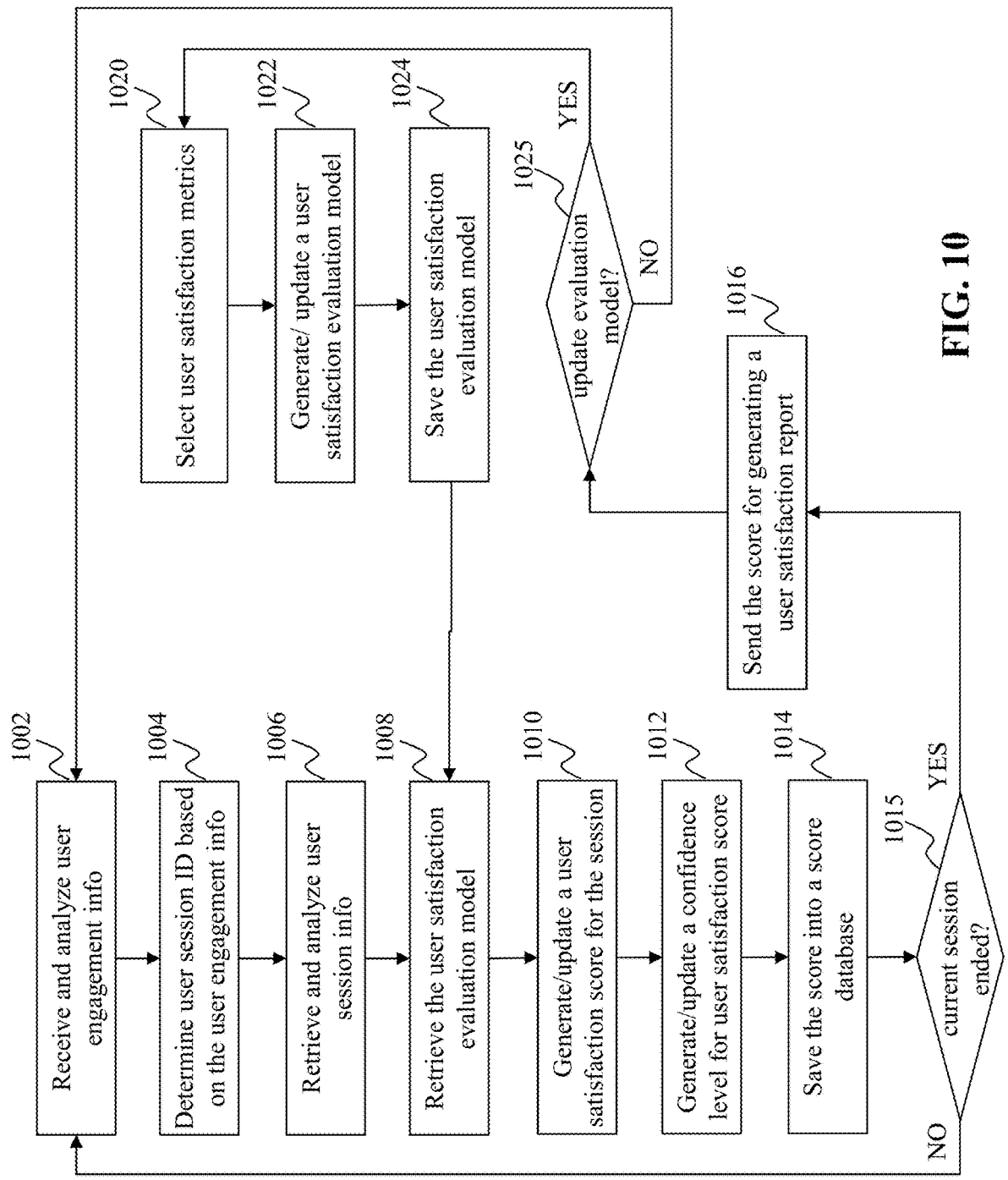
FIG. 10 is a flowchart of an exemplary process performed by a user satisfaction score determiner, according to an embodiment of the present teaching.

FIG. 10 is a flowchart of an exemplary process performed by a user satisfaction score determiner, e.g. the user satisfaction score determiner 350, according to an embodiment of the present teaching. Starting at 1002, user engagement information is received and analyzed. Moving to 1004, a user session ID is determined based on the user engagement information. At 1006, user session information is retrieved and analyzed based on the user session ID.

At 1020, one or more user satisfaction metrics are selected. At 1022, a user satisfaction evaluation model is generated or updated based on the selected one or more user satisfaction metrics. At 1024, the user satisfaction evaluation model is saved for retrieving in the future.

At 1008, the user satisfaction evaluation model is retrieved. Moving to 1010, a user satisfaction score for the user session is generated or updated based on the user satisfaction evaluation model. Optionally at 1012, a confidence level associated with the user satisfaction score may be generated or updated based on the user satisfaction evaluation model. At 1014, the user satisfaction score is saved into a score database, so that the score may be retrieved and updated when more user engagement information and/or user activities are obtained for the same user session.

At 1015, whether the current user session has ended is checked. If so, at 1016, the user satisfaction score is finalized and sent to the user satisfaction report generation unit 360 for generating a user satisfaction report, and the process moves to 1025. Otherwise, the process goes back to 1002 continue receiving user engagement information related to the current user session.

At 1025, whether to update the user satisfaction evaluation model is determined. If so, the process goes back to 1020 for selecting metrics and updating the model. Otherwise, the process goes back to 1002 to receive user engagement information related to another user session.

It can be understood that, in accordance with various embodiments, at least some of the above mentioned steps in FIG. 10 may happen without following the sequence shown in FIG. 10.

Figure 20:
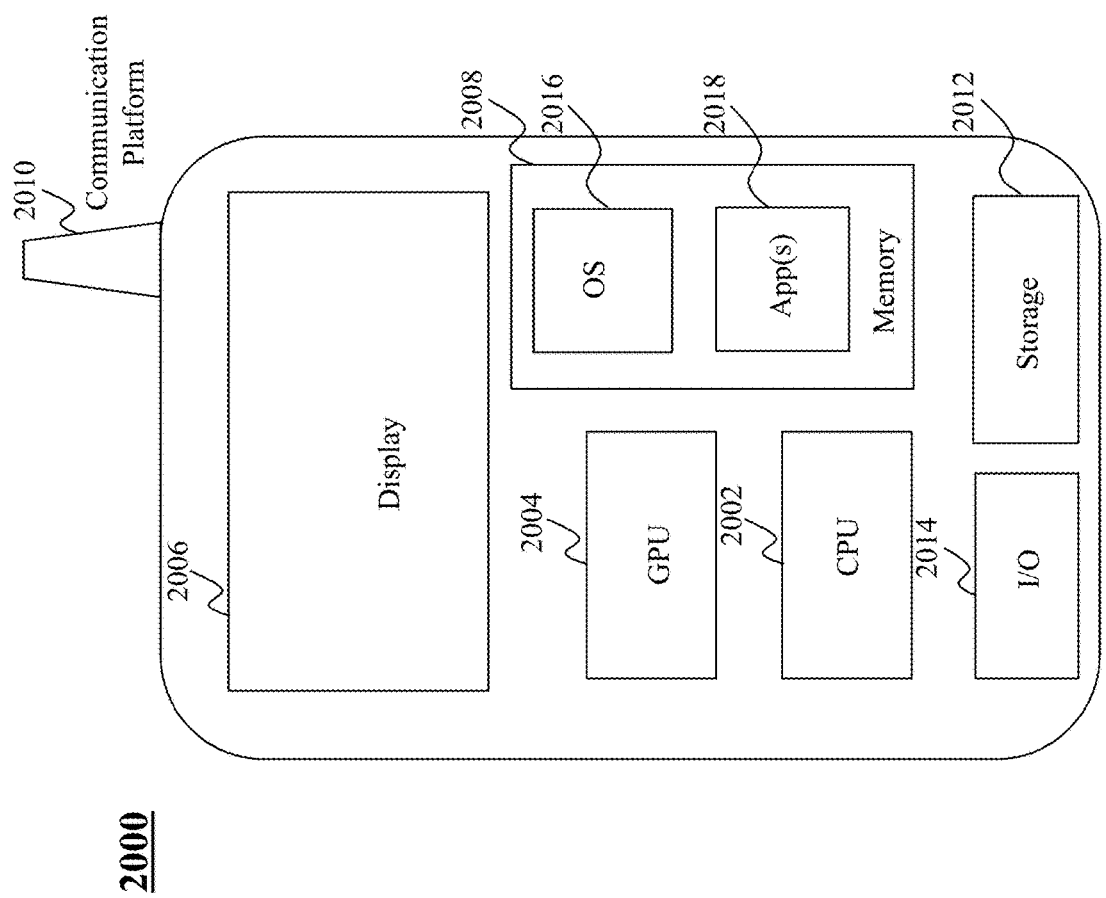
FIG. 20 depicts a general mobile device architecture on which the present teaching can be implemented.

FIG. 20 depicts a general mobile device architecture on which the present teaching can be implemented. In this example, the user device 110 is a mobile device 2000, including but is not limited to, a smart phone, a tablet, a music player, a handled gaming console, a GPS receiver. The mobile device 2000 in this example includes one or more central processing units (CPUs) 2002, one or more graphic processing units (GPUs) 2004, a display 2006, a memory 2008, a communication platform 2010, such as a wireless communication module, storage 2012, and one or more input/output (I/O) devices 2019. Any other suitable component, such as but not limited to a system bus or a controller (not shown), may also be included in the mobile device 2000. As shown in FIG. 20, a mobile operating system 2016, e.g., iOS, Android, Windows Phone, etc., and one or more applications 2018 may be loaded into the memory 2008 from the storage 2012 in order to be executed by the CPU 2002. The applications 2018 may include a web browser or any other suitable mobile search apps. Execution of the applications 2018 may cause the mobile device 2000 to perform some processing as described before. For example, the display of content items and search results is made by the GPU 2004 in conjunction with the display 2006. User inputs of search queries are received via the I/O devices 2014 and sent to the search engine system 130 via the communication platform 2010.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 21:
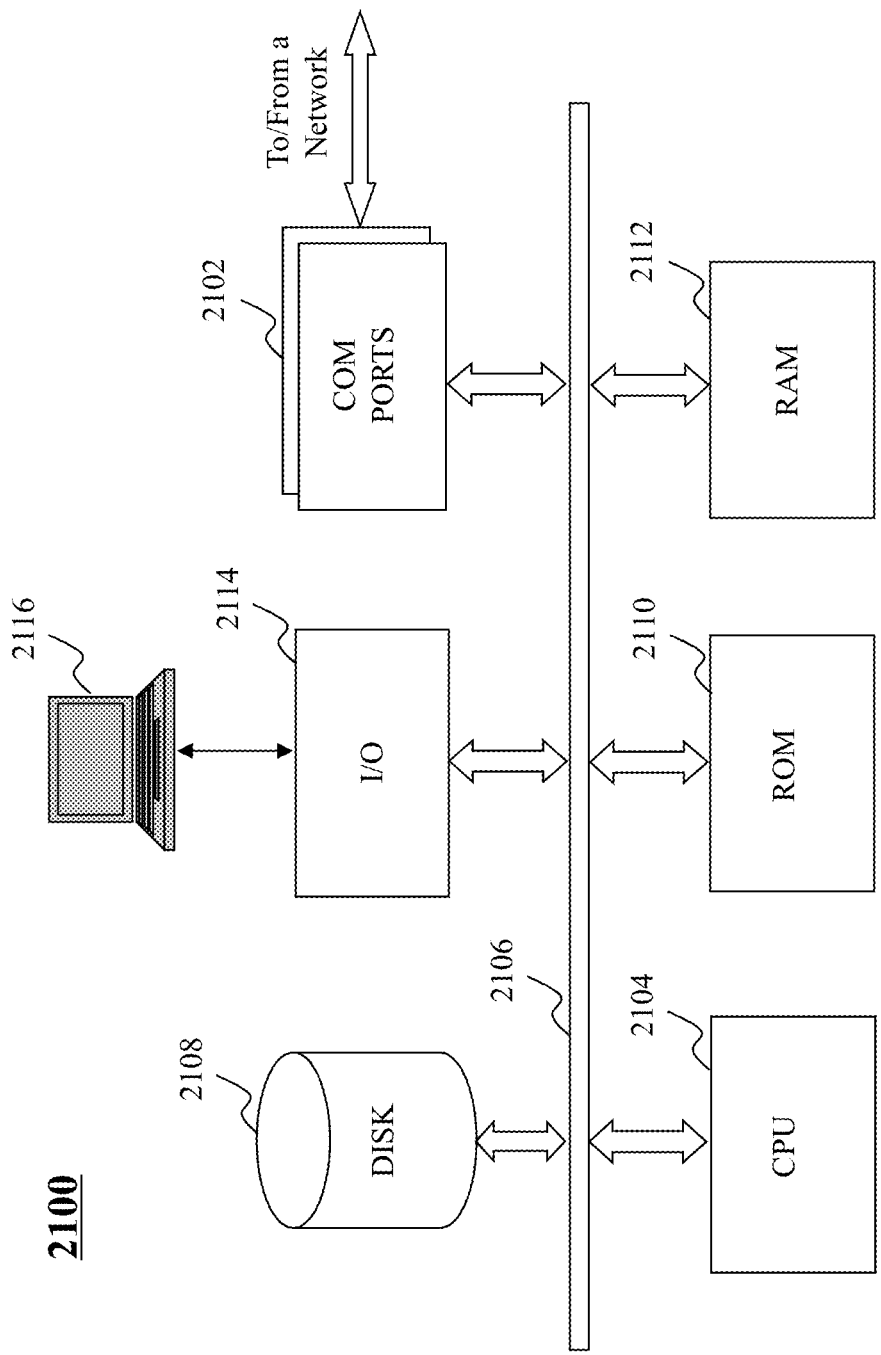
FIG. 21 depicts a general computer architecture on which the present teaching can be implemented.

FIG. 21 depicts a general computer architecture on which the present teaching can be implemented and has a functional block diagram illustration of a computer hardware platform that includes user interface elements. The computer may be a general-purpose computer or a special purpose computer. This computer 2100 can be used to implement any components of the user satisfaction evaluation architecture as described herein. Different components of the system, e.g., as depicted in FIGS. 1 and 2, can all be implemented on one or more computers such as computer 2100, via its hardware, software program, firmware, or a combination thereof. Although only one such computer is shown, for convenience, the computer functions relating to user satisfaction evaluation may be implemented in a distributed fashion on a number of similar platforms, to distribute the processing load.

The computer 2100, for example, includes COM ports 2102 connected to and from a network connected thereto to facilitate data communications. The computer 2100 also includes a CPU 2104, in the form of one or more processors, for executing program instructions. The exemplary computer platform includes an internal communication bus 2106, program storage and data storage of different forms, e.g., disk 2108, read only memory (ROM) 2110, or random access memory (RAM) 2112, for various data files to be processed and/or communicated by the computer, as well as possibly program instructions to be executed by the CPU 2104. The computer 2100 also includes an I/O component 2114, supporting input/output flows between the computer and other components therein such as user interface elements 2116. The computer 2100 may also receive programming and data via network communications.

Hence, aspects of the method of user satisfaction evaluation, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network, for evaluating user satisfaction with respect to a user query session, comprising:
receiving information related to a user query session comprising a plurality of queries from a user and user activities directed to a modification to a presentation of one or more information cards provided to the user in response to the plurality of queries, wherein each of the one or more information cards comprises content related to one of the plurality of queries;
computing a score with respect to the user query session based on the user activities directed to the modification to the presentation of the one or more information cards;
determining a level of satisfaction of the user with respect to the user query session based on the score and a confidence level associated with the score; and
generating, based on the level of satisfaction, user satisfaction information to be used for improving user experience,
wherein the plurality of queries are determined based on an idle period between any two consecutive queries of the plurality of queries being less than a predetermined criterion and a similarity in topic between the any two consecutive queries.

2. The method of claim 1, further including:
automatically generating a label associated with the user query session based on the score, wherein the label indicates whether the user is satisfied with the user query session.

3. The method of claim 1, further including:
predicting, based on the score associated with the user query session, a score associated with a new user query session of the user before a user activity is detected in the new user query session.

4. The method of claim 1, wherein the one or more information cards are presented on a mobile device and the user activities directed to the modification to the presentation of the one or more information cards comprise at least one of: a rotation to a portion of at least one of the one or more information cards, causing a portion of at least one of the one or more information cards to be moved from one position to another position on the at least one of the one or more information cards, or zooming in on a portion of at least one of the one or more information cards.

5. The method of claim 1, wherein the score is computed based on at least one of: personal information of the user or a topic related to the plurality of queries.

6. The method of claim 1, wherein:
the score is computed based on a model; and
the model is generated by a machine learning method and trained by data related to at least one of: information from one or more labels created by the user, user engagement information related to a user activity of the user, or one or more metrics related to the user engagement information.

7. The method of claim 1, further including:
determining the confidence level associated with the score, wherein the confidence level is determined based on at least one of the user activities detected during the user session and information needs of the user.

8. The method of claim 1, wherein:
the user satisfaction information comprises the level of satisfaction and the confidence level and is to be used by a search engine system for improving user experience;
the predetermined criterion comprises a predetermined temporal threshold; and
a plurality of information cards are provided to the user in response to each of the plurality of queries.

9. The method of claim 1, further comprising:
receiving a first query of the plurality of queries;
determining a first topic associated with the first query;
receiving a second query of the plurality of queries;
determining a second topic associated with the second query; and
determining that the similarity between the first topic and the second topic is greater than a predetermined similarity threshold such that the first query and the second query are recorded as being part of the user query session.

10. A system having at least one processor, storage, and a communication platform for evaluating user satisfaction with respect to a user query session, the system comprising:
a user activity detection unit, implemented on the at least one processor, configured for obtaining information related to a user query session comprising a plurality of queries from a user and user activities directed to a modification to a presentation of one or more information cards provided in response to the plurality of queries, wherein each of the one or more information cards comprises content related to one of the plurality of queries;
a user satisfaction determining unit, implemented on the at least one processor, configured for computing a score with respect to the user query session based on the user activities directed to the modification to the presentation of the one or more information cards; and
a user satisfaction report generation unit, implemented on the at least one processor, configured for:
determining a level of satisfaction of the user with respect to the user query session based on the score and a confidence level associated with the score, and
generating, based on the level of satisfaction, user satisfaction information to be used for improving user experience,
wherein the plurality of queries are determined based on an idle period between any two consecutive queries of the plurality of queries being less than a predetermined criterion and a similarity in topic between the any two consecutive queries.

11. The system of claim 10, wherein:
the user satisfaction report generation unit is further configured for automatically generating a label associated with the user query session based on the score; and
the label indicates whether the user is satisfied with the user query session.

12. The system of claim 10, wherein the user satisfaction report generation unit is further configured for predicting, based on the score associated with the user query session, a score associated with a new user query session of the user before a user activity is detected in the new user query session.

13. The system of claim 10, wherein the one or more information cards are presented on a mobile device and the user activities directed to the modification to the presentation of the one or more information cards comprise at least one of: a rotation to a portion of at least one of the one or more information cards, causing a portion of at least one of the one or more information cards to be moved from one position to another position on the at least one of the one or more information cards, or zooming in on a portion of at least one of the one or more information cards.

14. The system of claim 10, wherein the score is computed based on at least one of: personal information of the user or a topic related to the plurality of queries.

15. The system of claim 10, wherein:
the score is computed based on a model; and
the model is generated by a machine learning method and trained by data related to at least one of: information from one or more labels created by the user, user engagement information related to a user activity of the user, or one or more metrics related to the user engagement information.

16. The system of claim 10, wherein:
the user satisfaction determining unit is further configured for determining the confidence level associated with the score, wherein the confidence level is determined based on at least one of the user activities detected during the user session and information needs of the user.

17. A tangible non-transitory machine-readable medium having information recorded thereon for evaluating user satisfaction with respect to a user query session, wherein the information, when read by a machine, causes the machine to perform the following:
receiving information related to a user query session comprising a plurality of queries from a user and user activities directed to a modification to a presentation of one or more information cards provided to the user in response to the plurality of queries, wherein each of the one or more information cards comprises content related to one of the plurality of queries;
computing a score with respect to the user query session based on the user activities directed to the modification to the presentation of the one or more information cards;
determining a level of satisfaction of the user with respect to the user query session based on the score and a confidence level associated with the score; and
generating, based on the level of satisfaction, user satisfaction information to be used for improving user experience,
wherein the plurality of queries are determined based on an idle period between any two consecutive queries of the plurality of queries being less than a predetermined criterion and a similarity in topic between the any two consecutive queries.

18. The medium of claim 17, the information, when read by the machine, further causing the machine to perform the following:
automatically generating a label associated with the user query session based on the score, wherein the label indicates whether the user is satisfied with the user query session.

19. The medium of claim 17, the information, when read by the machine, further causing the machine to perform the following:
predicting, based on the score associated with the user query session, a score associated with a new user query session of the user before a user activity is detected in the new user query session.

20. The medium of claim 17, wherein the one or more information cards are presented on a mobile device and the user activities directed to the modification to the presentation of the one or more information cards comprise at least one of: a rotation to a portion of at least one of the one or more information cards, causing a portion of at least one of the one or more information cards to be moved from one position to another position on the at least one of the one or more information cards, or zooming in on a portion of at least one of the one or more information cards.

* * * * *